US009217083B2

(12) United States Patent
Hans et al.

(10) Patent No.: US 9,217,083 B2
(45) Date of Patent: Dec. 22, 2015

(54) COPOLYMERS CONTAINING POLYSILOXANE GROUPS AND HAVING AN EPOXY/AMINE SKELETAL STRUCTURE, AND USE THEREOF

(75) Inventors: Marc Hans, Wesel (DE); Wojciech Jaunky, Wesel (DE); Albert Frank, Xanten (DE); Thomas Launag, Voerde (DE); Jürgen Omeis, Dorsten-Lembeck (DE)

(73) Assignee: BYK-Chemie GmbH (DE)

( * ) Notice: Subject to any disclaimer, the term of this patent is extended or adjusted under 35 U.S.C. 154(b) by 181 days.

(21) Appl. No.: 13/878,702

(22) PCT Filed: Oct. 11, 2011

(86) PCT No.: PCT/EP2011/067748
§ 371 (c)(1),
(2), (4) Date: Jul. 3, 2013

(87) PCT Pub. No.: WO2012/049186
PCT Pub. Date: Apr. 19, 2012

(65) Prior Publication Data
US 2013/0289134 A1 Oct. 31, 2013

(30) Foreign Application Priority Data

Oct. 11, 2010 (EP) .................................. 10013493

(51) Int. Cl.
*C08G 77/24* (2006.01)
*C08L 83/08* (2006.01)
*C08G 59/18* (2006.01)
*C09D 5/16* (2006.01)
*C09D 7/02* (2006.01)
*C09D 7/06* (2006.01)
*C09D 7/12* (2006.01)
*C09D 17/00* (2006.01)
*C08G 59/30* (2006.01)

(52) U.S. Cl.
CPC ............... *C08L 83/08* (2013.01); *C08G 59/184* (2013.01); *C09D 5/1675* (2013.01); *C09D 7/02* (2013.01); *C09D 7/06* (2013.01); *C09D 7/125* (2013.01); *C09D 17/001* (2013.01); *C08G 59/306* (2013.01)

(58) Field of Classification Search
CPC ..... C08L 83/08; C08G 59/184; C08G 59/306
See application file for complete search history.

(56) References Cited

U.S. PATENT DOCUMENTS

| 5,364,923 | A | * | 11/1994 | Mikami | ........................... 528/27 |
| 5,618,860 | A | | 4/1997 | Mowrer et al. | |
| 6,730,766 | B2 | | 5/2004 | Schattenmann et al. | |
| 7,122,599 | B2 | | 10/2006 | Haubennestel et al. | |
| 7,312,260 | B2 | | 12/2007 | Krappe et al. | |
| 2004/0156809 | A1 | | 8/2004 | Ono et al. | |
| 2005/0020735 | A1 | | 1/2005 | Krappe et al. | |
| 2009/0118421 | A1 | * | 5/2009 | Falk | ............................... 524/588 |
| 2009/0221745 | A1 | | 9/2009 | Orth et al. | |

FOREIGN PATENT DOCUMENTS

| DE | 19501307 A1 | 7/1996 |
| DE | 19520312 A1 | 12/1996 |
| DE | 19919482 A1 | 11/2000 |
| DE | 10361436 A1 | 7/2005 |
| DE | 102006006716 A1 | 8/2007 |
| EP | 0289240 A1 | 11/1988 |
| EP | 0931537 A2 | 7/1999 |
| EP | 1193303 A2 | 4/2002 |
| EP | 1251152 A1 | 10/2002 |
| EP | 1288246 A1 | 3/2003 |
| EP | 1486524 A1 | 12/2004 |
| EP | 1532213 A2 | 5/2005 |
| EP | 1758550 A2 | 3/2007 |
| EP | 1980594 A1 | 10/2008 |
| JP | 6107766 A | 4/1994 |
| JP | 6216280 A | 8/1994 |
| WO | WO-9620971 | 7/1996 |
| WO | WO-01/88044 A1 | 11/2001 |
| WO | WO-03/093352 A1 | 11/2003 |
| WO | WO-2004/026268 A2 | 4/2004 |
| WO | WO-2004/056716 A1 | 7/2004 |
| WO | WO-2005/063637 A1 | 7/2005 |
| WO | WO-2005/074865 A2 | 8/2005 |
| WO | WO-2005/113676 A1 | 12/2005 |
| WO | WO-2006/125731 A1 | 11/2006 |
| WO | WO-2007/076967 A2 | 7/2007 |
| WO | WO-2008/092687 A1 | 8/2008 |

OTHER PUBLICATIONS

"International Application No. PCT/EP2011/067748, International Search Report and Written Opinion mailed Feb. 28, 2012", 13 pgs.
"International Application No. PCT/EP2011/067748, Reply filed Jan. 29, 2013 to Written Opinion", 8 pgs.
Garea, Sorina-Alexandra, et al., "The influence of some new montmorillonite modifier agents on the epoxy-montmorillonite nanocomposites structure", Applied Clay Science, vol. 50, No. 4, (2010), 469-475.
Garea, Sorina-Alexandra, et al., "The influence of some new montmorillonite modifier agents on the epoxy-montmorillonite nanocomposites structure", Database Accession No. 2010:1488128, Database CAplus. Chemical Abstracts Service, (Dec. 1, 2012), 2 pgs.

* cited by examiner

*Primary Examiner* — Margaret Moore
(74) *Attorney, Agent, or Firm* — Schwegman Lundberg & Woessner, P.A.

(57) ABSTRACT

The invention relates to a copolymer which contains at least one polysiloxane group and the skeletal structure of which is an addition compound of at least one amine and at least one epoxide. The invention further relates to the use of said products as additives in coating agents, plastics, or homogeneous dispersions, e.g. as a dispersing agent for organic and inorganic pigments and fillers in oil-based compositions, or as a surface modifying agent.

28 Claims, No Drawings

COPOLYMERS CONTAINING POLYSILOXANE GROUPS AND HAVING AN EPOXY/AMINE SKELETAL STRUCTURE, AND USE THEREOF

PRIORITY CLAIM TO RELATED APPLICATIONS

This application is a national stage application under 35 U.S.C. §371 of PCT/EP2011/067748, filed Oct. 11, 2011, and published as WO 2012/049186 A1 on Apr. 19, 2012, which claims priority to European Application No. 10013493.1, filed Oct. 11, 2010, which applications and publication are incorporated by reference as if reproduced herein and made a part hereof in their entirety, and the benefit of priority of each of which is claimed herein.

The present invention relates to copolymers which comprise polysiloxane groups and can be used as additives in coating material compositions, powder compositions, and polymeric molding compounds. The present invention further relates to the use of the products as additives in coating material compositions, powder compositions, or polymeric molding compounds—for example, as dispersants for organic and inorganic pigments and fillers in oil-based compositions, such as, for example, compositions based on vegetable oil, animal oil, or silicone oil, or as surface-modifying agents, such as, for example, flow and leveling agents, lubricants, agents for improving scratch resistance, hydrophobizing agents, and agents for improving the cleaning properties of the additized material.

The addition of silicone-containing compounds to coating materials and polymeric molding compounds is known (Lackadditive by Johan Bieleman, Weinheim; New York; Chichester; Brisbane; Singapore, Toronto: Wiley-VCH, 1998), in order, for example, to improve substrate properties, such as the wetting, the leveling, and the lubricity properties of the coating surfaces, or to obtain properties, such as improved scratch resistance in the case of furniture varnishes or vehicle paints, or to obtain antiadhesive properties, in the case of paper coatings, for example, or else to obtain easy-to-clean surfaces.

Another use of silicone-containing compounds lies in the treatment of powders, to improve them in terms of their dispersion properties and to enable them to be stably dispersed in oil-containing compositions.

Generally speaking, these compounds are synthesized by radical copolymerization techniques, with use, for example, of monomethacrylically functionalized, polysiloxane-functional silicones and other monomers, such as methyl methacrylate, butyl methacrylate, hydroxymethyl methacrylate, glycerylmethyl methacrylate, acrylonitrile, dimethylacrylamide, or vinylpyrrolidone, for example.

In this respect, EP 1193303 B1 describes a coating composition which possesses dirt-repellent and antiadhesive properties, the composition comprising an additive in which polysiloxane side chains are attached to a polymeric main chain.

In WO 2006/125731, a lubricity and leveling additive is obtained by a radical copolymerization of at least one mono- or diperfluoro ester of an unsaturated dicarboxylic acid, at least one terminally reactive polysiloxane, and at least one vinylic monomer.

With regard to cosmetic compositions, EP 0931537 B1 describes the dispersion of organic and inorganic powders in oil-containing compositions by means of polysiloxane-containing compounds. The polymers are prepared by radical copolymerization of vinylic polysiloxane macromonomers with other vinylic monomers, the other vinylic monomers containing a nitrogen-containing group, a polyoxyalkylene group, an anionic group, or a polylactone group.

Similarly, US 2004/0156809 A1 describes the surface treatment of powders by means of an acrylic/silicone copolymer which bears at least one hydrolyzable silyl group in the molecule.

A multiplicity of substances are used as dispersants for pigments and fillers. Alongside very simple compounds with a low molecular mass, such as fatty acids and their salts or alkylphenyl ethoxylates, for example, complex structures are also used. The systems which are used as wetting additives and dispersion additives also include epoxide adducts and their salts. US 2005/0020735 includes a review of the patent literature existing in this field.

WO 2008/092687 A1 and WO 2005/113676 A1 describe, for example, wetting and dispersing additives having a comb or graft copolymer structure on the basis of epoxy/amine adducts which bear polyether side chains.

While the prior-art compounds offer an acceptable stability of the pigment dispersion, there remains a demand for improved systems, for lowering the sedimentation of pigments, enhancing the color faithfulness of pigment dispersions, and ensuring a broader compatibility of copolymers with regard to different compositions—such as, for example, compatibility with very apolar compositions, such as oil-based and silicone-based formulations. Furthermore, surface additives from the prior art frequently tend to form foam or to impair the visual impression of the subsequent coating; for these reasons, efforts are made to reduce foaming and optimize the leveling, hazing, and cratering while at the same time retaining or improving on the surface-modifying effect.

The objectives have been achieved by copolymers which comprise at least one polysiloxane group attached to the basic copolymer scaffold, said scaffold being an adduct of at least one amine and at least one epoxide. Preferably, to the basic scaffold of these epoxy/amine copolymers, the polysiloxane group is introduced into the copolymer via a monoaminofunctional polysiloxane (B) and/or via a monoisocyanate-functional polysiloxane (C). This epoxy/amine copolymer containing polysiloxane groups is (i) a reaction product of at least one epoxide and at least one amine, in which case said at least one amine is a monoamino-functional polysiloxane (B), or (ii) the reaction product between at least one epoxide and at least one polysiloxane-free amine (D), which is subsequently reacted with at least one monoisocyanate-functional polysiloxane (C).

The polysiloxane groups attached to the epoxy/amine scaffold are preferably introduced into the target product in the following ways:

(1) in the case of the reaction of an epoxide (A) with an amine, at least one of the amine compounds is a monoamino-functional polysiloxane (B), or (2) at least one monoisocyanate-functional polysiloxane (C) is reacted, following the reaction between an epoxide and an amine, with the reaction product thereof, or (3) in the case of the reaction of an epoxide (A) with an amine, at least one of the amine compounds is a monoamino-functional polysiloxane (B) and at least one monoisocyanate-functional polysiloxane (C) is reacted, following the reaction between an epoxide and an amine, with the reaction product thereof.

In this way the copolymers may be obtained as follows:
(A)+(B)
(A)+(B)+(D)
(A)+(C)+(D)
(A)+(B)+(C)
(A)+(B)+(C)+(D)

The copolymers may optionally also be salified or quaternized. Salification and/or quaternization may take place in accordance with methods known to the skilled person. Preferred methods are also described below.

Components (A), (B), (C), and (D) of the present invention are described in more detail below.

Component (A): Mono- or Polyfunctional Epoxide

As component (A) it is possible to use aromatic and/or aliphatic and/or polyalkylene oxide-containing epoxides. The epoxides may contain one or more, preferably two, epoxy groups per molecule and possess preferably at least six carbon atoms. Mixtures of different epoxides may likewise be used.

In one preferred embodiment of the present invention, epoxides used are the epoxides (A), which may be represented by the following general formula (I):

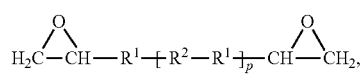
(I)

in which all $R^1$s independently of one another are —$CH_2$—O—, —O—$CH_2$—, or —$CH_2$—, all $R^2$s independently of one another are alkylene radicals, cycloalkylene radicals, arylene radicals, or aralkylene radicals, and p is 1-8.

Even more preferably, glycidyl ethers of polyols are used, known generally under the name epoxy resins, including different epoxy resins, such as conventional, commercially available epoxy resins. In one preferred embodiment of the present invention, component (A) is a diepoxide of the general formula (I'):

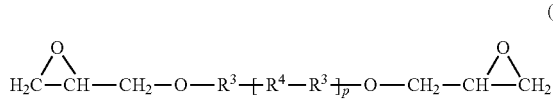
(I')

in which all $R^3$s independently of one another are alkylene radicals, cycloalkylene radicals, arylene radicals, or aralkylene radicals, all $R^4$s independently of one another are O or alkylene radicals, and p is 0-8.

Preferred examples from the group of the aromatic polyepoxides are reaction products of diphenyl-olpropanes (bisphenol A) with epichlorohydrin, and the higher homologs thereof, which are available for example under the trade names D.E.R. or Epikote (from Dow Chemical Company or Hexion Specialty Chemicals). Examples of aliphatic polyepoxides are hexane 1,6-diglycidyl ether and butane 1,4-diglycidyl ether. These aliphatic polyepoxides are available for example under the trade names Grilonit (from EMS-Chemie).

The aliphatic polyepoxides may, furthermore, contain oxygen in the chain, such as polypropylene glycol diglycidyl ethers, polyethylene glycol diglycidyl ethers, or polytetrahydrofuran diglycidyl ethers. The polyethylene glycol diglycidyl ethers are available for example under the trade names Epiol E-400 or Epiol E-1000 (from NOF Corporation).

Especially preferred is the use of reaction products of diphenylolpropane (bisphenol A) with epichlorohydrin, and the higher homologs thereof, and also hexane 1,6-diglycidyl ether.

Components which Contain Polysiloxane Groups: Monoamino-Functional Polysiloxanes (B) and Monoisocyanate-Functional Polysiloxanes (C)

It is essential to the invention that the copolymers of the present invention contain at least one polysiloxane group attached to the scaffold. The groups containing polysiloxane groups originate preferably from monoamino-functional polysiloxanes (B) and/or from a monoisocyanate-functional polysiloxane (C). The polysiloxane groups are inserted into the copolymer preferably via a monoamino-functional polysiloxane (B) and/or via a monoisocyanate-functional polysiloxane (C). The components (B) and (C) are described in more detail below.

Component (B): Monoamino-Functional Polysiloxane

As component (B) it is preferred to use a monoamino-functional polysiloxane of the following formula:

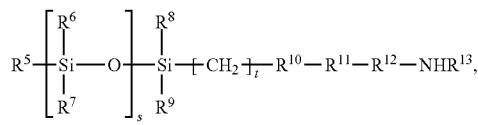

in which $R^5$ is a halogenated alkyl radical having 1 to carbon atoms, a saturated linear alkyl radical having 1 to 30 carbon atoms, a saturated branched or cyclic alkyl radical having 3 to 30 carbon atoms, or an aryl radical, an alkylaryl radical, or an arylalkyl radical having 6 to 30 carbon atoms, preferably a methyl radical or a butyl radical, all $R^6$s and $R^7$s independently of one another are saturated linear alkyl radicals having 1 to 6 carbon atoms, saturated branched or cyclic alkyl radicals having 3 to 6 carbon atoms, unsaturated alkyl radicals having 2 to 6 carbon atoms, or aryl radicals, alkylaryl radicals, or arylalkyl radicals having 6 to 12 carbon atoms, preferably methyl, ethyl, propyl, butyl, or fluorinated alkyl radicals having 1 to 30 carbon atoms, or phenyl or substituted phenyl radicals, more preferably methyl radicals, all $R^8$s and $R^9$s independently of one another are $R^5[SiR^6R^7O]_s$, where $R^5$, $R^6$, and $R^7$ are as defined above and are selected independently thereof, saturated linear alkyl radicals having 1 to 6 carbon atoms, saturated branched or cyclic alkyl radicals having 3 to 6 carbon atoms, alkene radicals having 2 to 6 carbon atoms, or aryl radicals, alkylaryl radicals, or arylalkyl radicals having 6 to 12 carbon atoms, preferably methyl, ethyl, propyl, butyl, or fluorinated alkyl radicals, or phenyl or substituted phenyl radicals, more preferably methyl radicals, s is 1 to 400 and t is 2 to 30, $R^{10}$ is $(CH_2)_u$, O, S, or $C_6R^{14}_4$, where u is 0 or 1 and all $R^{14}$s independently of one another are hydrogen or an alkyl radical having 1 to 6 carbon atoms, $R^{11}$ is $(CH_2)_v$ or $(CH_2CHR^{15}O)_w$, where v is 0 to 30 and w is 0 to 50 and all $R^{15}$s independently of one another are hydrogen, a saturated linear alkyl radical having 1 to 6 carbon atoms, a saturated branched alkyl radical having 3 to 6 carbon atoms, or a cyclic alkyl radical having 4 to 6 carbon atoms, $R^{12}$ is $(CH_2)_x$ where x is 0 to 3, and $R^{13}$ is hydrogen, a saturated linear alkyl radical having 1 to 6 carbon atoms, a saturated branched alkyl radical having 3 to 6 carbon atoms, or an aryl radical, an alkylaryl radical, or an arylalkyl radical having 6 to 9 carbon atoms. Preferably $R^{19}$ is hydrogen and the group in question is a primary amine group.

Preferably, $[CH_2]_tR^{10}R^{11}R^{12}NHR^{13}$ is represented by a 2-aminoethyl radical, 3-aminopropyl radical, 3-aminopropyl ethyl ether radical, or 6-aminohexyl radical. Preferably, the functional radical $[CH_2]_tR^{10}R^{11}R^{12}NHR^{13}$ containing terminal amino groups on the polysiloxane chain is a 3-aminopropyl radical.

The organopolysiloxane radical $R^5[SiR^6R^7O]_sSiR^8R^9$ of component (B) preferably possesses a linear or branched structure and preferably possesses a number-average molecular weight in the range from 200 to 30 000, more preferably in the range from 500 to 10 000, and even more preferably in the range from 500 to 5000 g/mol.

The synthesis of monoamino-functional polysiloxanes is described later on below.

Component (C): Monoisocyanate-Functional Polysiloxane

As component (C) it is preferred to use a monoisocyanate-functional polysiloxane (C) of the following formula:

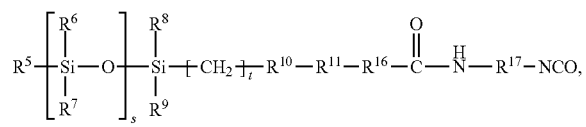

in which $R^5$, $R^6$, $R^7$, $R^8$, $R^9$, R, $R^{11}$, s, and t are as defined for component (B),
$R^{16}$ is O, S, or NH, and $R^{16}$ is omitted if w is at least 1, and $R^{17}$ is a saturated linear alkylene radical having 1 to 30 carbon atoms, a saturated branched or cyclic alkylene radical having 3 to 30 carbon atoms, or an arylene radical, an alkylarylene radical, or an arylalkylene radical having 6 to 30 carbon atoms. Preferably, $R^{17}$ is the radical of the diisocyanate without the NCO groups.

As isocyanate, preference is given to using aliphatic, cycloaliphatic, or araliphatic isocyanates. For example, aryl-substituted aliphatic diisocyanates are used, as described in Houben-Weyl, Methoden der Organischen Chemie, volume 14/2, pages 61-70 and in an article by W. Siefken, Justus Liebig's Annalen der Chemie 562, pages 75-136. Preferred examples are ethylene 1,2-diisocyanate, tetramethylene 1,4-diisocyanate, hexamethylene 1,6-diisocyanate (HDI), 2,2,4-(2,4,4)-trimethylhexamethylene 1,6-diisocyanate (TMDI), 1,9-diisocyanato-5-methylnonane, 1,8-diisocyanato-2,4-dimethyloctane, dodecane 1,12-diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanates, IPDI), 1,4-diisocyanatomethyl-2,3,5,6-tetramethylcyclohexane, decahydro-8-methyl(1,4-methanol-naphthalene-2 (or 3), 5-ylenedimethylene diisocyanate, hexahydro-4,7-methanoindan-1 (or 2), 5 (or 6) ylenedimethylene diisocyanate, hexahydro-4,7-methanoindan-1 (or 2), 5 (or 6) ylene diisocyanate, hexahydrotolylene 2,4- and/or 2,6-diisocyanate (H6-TDI), toluene 2,4- and/or 2,6-diisocyanate, perhydro-2,4'-diphenylmethane diisocyanate, perhydro-4,4'-diphenylmethane diisocyanate ($H_{12}$MDI), 4,4'-diisocyanato-3,3'-5,5'-tetramethyldicyclohexylmethane, 4,4'-diisocyanato-2,2',3,3', 5,5',6,6'-octamethyldicyclohexylmethane, ω,ω'-diisocyanato-1,4-diethylbenzene, 1,4-diisocyanatomethyl-2, 3,5,6-tetramethylbenzene, 2-methyl-1,5-diisocyanatopentane (MPDI), 2-ethyl-1,4-diisocyanatobutane, 1,10-diisocyanatodecane, 1,5-diisocyanato-hexane, 1,3-diisocyanatomethylcyclohexane, 1,4-diisocyanatomethylcyclohexane, and also any mixture of these compounds. Further preferred isocyanates are described in the aforementioned article by Siefken on pages 122 ff. 2,5(2,6)-Bis(isocyanatomethyl)bicyclo-[2.2.1]heptane (NBDI) is preferably in pure form or as part of a mixture. Particularly preferred are those aliphatic and cycloaliphatic isocyanates and their isomer mixtures that are readily obtained industrially.

With very particular preference, $R^{17}$ is the radical of toluene 2,4-diisocyanate, toluene 2,6-diisocyanate, or a mixture of these radicals, or the radical of isophorone diisocyanate (IPDI), in each case without the NCO groups.

The organopolysiloxane radical $R^5[SiR^6R^7O]_sSiR^8R^9$ of component (C) preferably possesses a linear or branched structure and preferably possesses a number-average molecular weight in the range from 200 to 30 000, more preferably in the range from 500 to 10 000, and more preferably still in the range from 500 to 5000 g/mol.

The synthesis of the monoisocyanate-functional polysiloxanes (C) is described later on below.

One option for the preparation of linear, monofunctional polysiloxanes is the equilibration of cyclic and open-chain polydialkylsiloxanes with terminally difunctional polysiloxanes, such as, for example, terminal —SiH or —$NH_2$ difunctional polydialkylsiloxanes, or what are called functional blockers, as described in Noll (Chemie and Technologie der Silicone, VCH, Weinhelm, 1984) and Yigör, I. and McGrath, J. E. (*Polysiloxane Containing Polymers: A Survey of Recent Development; Advances in Polymer Science*; Springer-Verlag: New York, 1988; vol. 86). For statistical reasons, the reaction product consists of a mixture of cyclic, difunctional, monofunctional, and nonfunctional polysiloxanes. The fraction of linear polysiloxanes in the reaction mixture can be raised by removing the lower cyclic structures distillatively. Within the linear polysiloxanes, the fraction of monofunctional polysiloxanes in the equilibration reaction product ought to be as high as possible. Depending on the proportion of the reactants in the synthesis of the copolymers, difunctional polysiloxanes can lead to unwanted crosslinking, and, depending on application, nonfunctional polysiloxanes can lead to instances of hazing and incompatibility.

Preference is given to the use of strictly mono-SiH-functional polysiloxanes, in other words those which have only one silane-hydrogen group. These linear monofunctional polysiloxanes can be synthesized, for example, via a living anionic polymerization of cyclic polysiloxanes, e.g., hexamethylenecyclotrisiloxane. This process is described in T. Suzuki in Polymer, 30 (1989) 333, among others. The reaction is illustrated by way of example in the following reaction scheme:

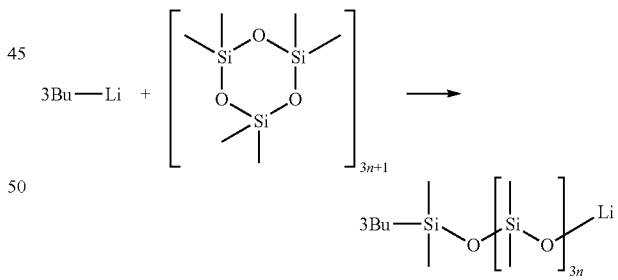

The $SiHMe_2$ functionalization of the end group can be accomplished using functional chlorosilanes, such as dimethylchlorosilane, in analogy to the following reaction scheme and in accordance with processes that are known to a person of ordinary skill in the art.

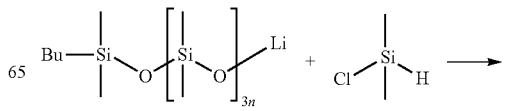

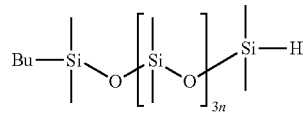

If branched SiH-functional polysiloxanes are desired, it is possible to use monomethyldichlorosilane or trichlorosilane for the SiH functionalization of the end group.

The SiH-functional polysiloxanes are reacted in a hydrosilylation reaction with a (terminal) ethylenically unsaturated amine, such as allylic or vinylic amines, to give monoaminofunctional polysiloxanes. This is described below, for allylamine as an exemplar.

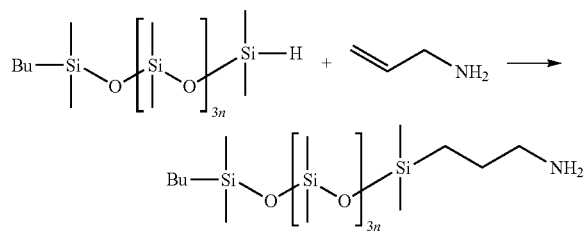

The hydrosilylation takes place typically under the following conditions: The SiH-functional polysiloxane is introduced at room temperature. Under a nitrogen atmosphere, the contents of the reactor are then heated to 85° C. to 140° C., for example. A hydrosilylation catalyst is added, examples being the Speiers or Karstedt catalysts that are commonly used. Depending on the anticipated exothermic character of the reaction, some or all of the allyl compounds are added. The temperature rises as a result of the exothermic reaction that then proceeds. It is usual to try to keep the temperature within a range from 90° C. to 120° C. If a portion of the allyl compounds remains to be metered in, the addition is made such that the temperature remains within the range from 90° C. to 120° C. Following complete addition, the temperature is held at 90° C. to 120° C. for some time longer. The progress of the reaction can be monitored by gas-volumetric determination of the remaining SiH groups or by infrared spectroscopy (silicon hydride absorption band at 2150 cm$^{-1}$).

Monoisocyanato-functional polysiloxanes can be prepared by the processes as described in DE 199 19 482 A1. For that purpose, monohydroxy-functional polysiloxane compounds can be reacted with an excess of diisocyanate, preferably toluene 2,4-diisocyanate, toluene 2,6-diisocyanate, or isomer mixtures of toluene 2,4-diisocyanate and toluene 2,6-diisocyanate, or isophorone diisocyanate, and the unreacted portion of the diisocyanate is preferably removed again from the reaction mixture. An excess of diisocyanate avoids coupling products (diadducts) having two urethane bonds. Non-NCO-functional diadducts of such kind cannot be reacted further and are unable to be incorporated subsequently during the reaction. Depending on the application, nonfunctional polysiloxanes may lead to instances of hazing and incompatibility.

Low fractions of residual diisocyanate can lead to crosslinking during the synthesis of the products. Through the purification of the reaction mixture, preferably by means of a thin-film evaporator, however, the fractions can be kept very low. The monoisocyanato-functional polysiloxanes (C) therefore preferably have only very low fractions (<1 wt. %), more preferably no fractions, of residual diisocyanates.

Component (D): Polysiloxane-Free Amines

As component (D), preference is given to using polysiloxane-free amines (D) of the following formula (II) to construct the basic copolymer scaffold:

$$HR^{18}N\text{—}R^{19} \tag{II}$$

in which $R^{18}$ is hydrogen, an alkyl radical, a cycloalkyl radical, an aryl radical, or an aralkyl radical and
$R^{19}$ is an alkyl radical, a cycloalkyl radical, an aryl radical, an aralkyl radical, $R^{20}$—Z, or $CHR^{21}CH_2(OCH_2CH_2)_q$ $(OCHR^{22}CH_2)_r$—O—$R^{23}$, where
$R^{20}$ is an alkylene radical,
Z is a heterocyclic radical,
$R^{21}$ is hydrogen, an alkyl radical having 1 to 4 carbon atoms, or an aryl radical,
all $R^{22}$s independently of one another are alkyl radicals having 1 to 4 carbon atoms, or aryl radicals,
$R^{23}$ is an alkyl radical having 1 to 12 carbon atoms, a cycloalkyl radical having 3 to 12 carbon atoms, or an aryl radical having 6 to 12 carbon atoms, and
q and r independently of one another are integers from 0 to 100, with the proviso that at least one of the indices q and r is not 0.

Preferably $R^{18}$ is H. The aliphatic, cycloaliphatic, aromatic, or araliphatic amines of component (D) preferably possess 3 to 28 carbon atoms. Typical examples are propylamine, butylamine, and benzylamine.

In one preferred embodiment the polysiloxane-free amine (D) of the formula (II) bears a further functional group. The amine having the further functional group may be used in addition to the above-mentioned polysiloxane-free amine without further functional group, or in its place. Preference is given to using at least one polysiloxane-free amine (D) of the formula (II) to construct the copolymer, the polysiloxane-free amine (D) bearing at least one, preferably one, further functional group. Especially preferred as additional functional groups are those which do not react with epoxides under the reaction conditions employed. Preferred functional groups are hydroxyl groups, tertiary amino groups, or double bonds. Suitable amines which bear an additional functional group are, for example, ethanolamine, butanolamine, 2-amino-2-methyl-1-propanol, 3-(dimethylamino)-1-propylamine, and oleylamine. Suitable amines which bear more than one additional functional group are, for example, 2-amino-2-ethyl-1, 3-propanediol or 2-amino-2-hydroxymethyl-1,3-propanediol. Particularly preferred are ethanolamine, butanolamine, 3-(dimethylamino)-1-propylamine, and oleylamine.

As component (D) it is also possible to use an amine with $R^{20}$=an alkylene radical and Z=a heterocyclic radical. Amines of this kind are preferably heterocyclic compounds having 5-membered or 6-membered rings, containing preferably nitrogen and/or oxygen as heteroatoms, such as N-(3-aminopropyl)imidazole or N-(2-aminoethyl)morpholine, for example.

As component (D) it is also possible to use polyoxyalkyleneamines in which $R^{18}$ is H or alkyl group having 1 to 12 carbon atoms and $R^{19}$ is $CHR^{21}CH_2$ $(OCH_2CH_2)_q$ $(OCHR^{22}CH_2)_r$—O—$R^{23}$. Suitable polyoxyalkyleneamines are disclosed, for example, in WO 96/20971, page 7, line 22 to page 10, line 17, as compounds which on the one hand bear primary and/or secondary amino groups and on the other hand contain reaction products of alkylene oxides as structural units. Alkylene oxides which can be used by way of example are ethylene oxide, propylene oxide, butylene oxide, styrene oxide, or mixtures thereof. The number-average molecular weight of the polyoxyalkylene may be 100 to 12

000 g/mol. Preferred polyoxyalkyleneamines possess a number-average molecular weight of approximately 1000 to 3000 g/mol. These polyoxyalkyleneamines are available for example under the trade names Jeffamine and Surfamine from the company Huntsman LLC Houston, Tex.

Primary monoamino-functional amines are used preferably as component D.

One particularly preferred embodiment of the invention embraces copolymers which contain polysiloxane groups and whose scaffold is an adduct of diepoxides and monoamino-functional amines. The amines used are preferably primary, and it is further of advantage if the basic scaffold corresponds to an amino-functionally terminated copolymer.

Process for Preparing the Copolymers

The present invention further relates to a process for preparing the copolymers of the invention, in which the basic copolymer scaffold is constructed by reacting at least one epoxide with at least one amine and in that at least one polysiloxane group is attached to the scaffold.

The polysiloxane group is introduced into the epoxy/amine copolymer preferably
(a) by the reaction of an epoxide with a monoamino-functional polysiloxane (B)
and/or
(b) by the reaction of an epoxy/amine copolymer with a monoisocyanate-functional polysiloxane (C).

For this there are two processes available by which the copolymers containing at least one polysiloxane group are preferably prepared.

Process 1)

According to a first process, the at least one epoxide (A) is reacted with the at least one monoamino-functional polysiloxane (B) or with at least one polysiloxane-free amine (D) and at least one monoamino-functional polysiloxane (B). In other words, the at least one epoxide (A) is reacted with at least one monoamino-functional polysiloxane (B) or with a mixture of the monoamino-functional polysiloxane (B) with a polysiloxane-free amine (D).

Furthermore, these epoxy/amine copolymers containing polysiloxane groups can be reacted with monoisocyanate-functional polysiloxanes (C) in a subsequent reaction.

In one embodiment of the invention, components (A) and (B) or a mixture of components (A) and (B) and (D) are reacted with one another in a stoichiometric excess of component (A), to give epoxide-terminated copolymers, or in a stoichiometric excess of component (B) or of the mixture of (B) and (D), to form amino-functionally terminated copolymers. Furthermore, components (A) and (B) or a mixture of components (A) and (B) and (D) may also be reacted stoichiometrically with one another.

One preferred embodiment uses a stoichiometric excess of component (B) or of the mixture of components (B) and (D), to obtain amino-functionally terminated copolymers.

Process 2)

The at least one epoxide (A) is reacted with the at least one polysiloxane-free amine (D) and the product is subsequently reacted with the at least one monoisocyanate-functional polysiloxane (C). As already described for process 1), either an excess of component (A) or of component (D) is used, to give epoxide-functionally or amino-functionally terminated copolymers. In one preferred embodiment of the present invention, amino-functionally terminated copolymers are obtained. Following complete reaction between (A) and (D), the at least one monoisocyanate-functional polysiloxane (C) is added subsequently, in order to introduce the polysiloxane group into the molecule. A urethane bond is formed if the monoisocyanate-functional polysiloxane (C) is reacted with a hydroxyl group from the epoxy/amine adduct which forms the main chain (basic scaffold). A urea bond is formed if the monoisocyanate-functional polysiloxane (C) is bonded, for example, to a terminal amino group of the epoxy/amine polymer backbone. Since the process takes place statistically, it is usual for there to be a mixture of products with urethane groups and urea groups via which the polysiloxanes are attached to the main chain.

In one preferred embodiment, the copolymers are amino-functionally terminated copolymers, preferably obtained by one of the above processes. Such amino-functionally terminated copolymers have an additionally improved shelf life.

In addition to the use of monofunctional amines, it is also possible to use a relatively small amount of amines having two or more amino groups per molecule. Such compounds could be used in order to raise the molecular weight of the addition compounds of the invention, this being an advantage for the purpose of controlling the polymer architecture or the compatibility.

The reaction for preparing copolymers can be performed in a solvent system. Preferably, however, the reaction is carried out in bulk by the processes known to a person of ordinary skill in the art. The reaction temperatures chosen are dependent on the reactivity of the reactants. Many epoxides react with amines even at room temperature. For less reactive epoxides, however, reaction temperatures of up to 160° C. may be necessary. Particularly suitable reaction temperatures for implementing the reaction of epoxides with amines are situated at approximately 50 to 150° C. Where necessary, the catalysts known to a person of ordinary skill in the field of art may also be used, in order to accelerate the reaction. The number-average molecular weight of the copolymers is preferably in the range from 500 to 200 000 g/mol. The number-average molecular weight is more preferably in the range from 500 to 50 000 g/mol, and very preferably in the range from 1000 to 20 000 g/mol.

Description of the Modifications

The copolymers obtained by the reaction between (A) and (B) or (A), (B), and (D) or (A), (C), and (D), or (A), (B), and (C), or (A), (B), (C), and (D), represent valuable additives having a broad compatibility spectrum for coating material compositions, powder compositions, and polymeric molding compounds. They can be used in the form in which they are obtained. The copolymers, however, may also be subsequently modified by means of polymer-analogous reactions. In order to adapt the properties of the polymers to specific requirements for each individual purpose, it may in certain cases be desirable to subject the products to a further modification. Suitable modifications are based on reactions with epoxide, amine, or hydroxyl groups which may be present in the epoxy/amine addition compounds of the invention. In the course of the modification, all of these groups or else only some of these groups may be reacted.

The following modification reactions may be combined in order for example to give multiply modified addition compounds. If two or more modification reactions are to be performed in succession, it must be ensured that a sufficient number of reactive groups are retained in the molecule for one or more successive reactions. Said modifications constitute advantageous embodiments of the present invention and can be realized for example by:
1. Reaction of the terminal amino groups with isocyanates, lactones, cyclic carbonates, anhydrides, or acrylates
2. Salification, alkylation, or oxidation of the amino groups, to give quaternary ammonium salts or nitrogen oxides 3. Reaction of the terminal epoxy groups with amines or acids
4. Reaction of remaining hydroxyl groups with carboxylic acids, lactones, anhydrides and/or isocyanates.

The terminal amino groups and the remaining hydroxyl groups can be reacted with isocyanates, as described above in sections 1 and 4. The formation of urea or of urethane is carried out in the manner known to a person of ordinary skill in the art.

The conversion of the hydroxyl group into a urethane group can be carried out if hydroxyl groups are disruptive in the paint system. One example is the use of monoisocyanato polyethers, polyesters and/or polyether/ester compounds, as described in WO 2008/092687 A1, for example, in order to ensure a broader compatibility of the additives in coating material systems. Another example is the use of monoisocyanato-functional adducts of perfluoro group-containing monoalcohols and diisocyanates, in order to achieve a drastic reduction in the surface energy of the coatings.

The free remaining hydroxyl groups of the addition compounds of the invention may be esterified for example as described in section 4. The esterification reaction is carried out in the manner known to a person of ordinary skill in the art. Where there are also free amino groups in the addition product of the invention, it is advisable to convert them into salts prior to the esterification, in order to ensure a satisfactory reaction rate. In the case of a partial transesterification, hydroxyl groups are retained, which may be furthermore refined or may remain free. The free hydroxyl groups are able to react with the coating system. It is also possible, for example, for reactive double bonds or an acid function to be introduced, by reacting the hydroxy-functional or amino-functional units in the main chain of the copolymer with maleic anhydride. Examples of other suitable anhydrides for introducing the acid function are succinic anhydride, phthalic anhydride, and trimellitic anhydride. Another possibility lies in the esterification of hydroxy-functional units within the copolymer with structurally different anhydrides. For better water solubility, for example, the acid function can also be converted into a salt, using alkanolamines, for example.

It is possible, furthermore, by subsequent acrylicization and/or methacrylicization of the hydroxyl groups, to obtain products which can be introduced reliably into paint systems, more particularly into paint systems which are intended for radiation curing, such as for UV curing or electron beam curing, for example. The terminal amino group may also be reacted with acrylates, as described in section 1. Thus, for example, when polyfunctional acrylates are used, the introduction of reactive double bonds into the reaction products can be accomplished, and these double bonds can then be employed in radiation-curing processes.

The modification of the amino groups, as described in section 2, takes place by processes known to a person of ordinary skill in the art. Quaternization of the nitrogen atom of an amino group, for example, may take place using alkyl or aralkyl halides, halocarboxylic esters or epoxides.

Description of the Use of the Additives

Additionally provided by the invention is the use of the copolymers as additives in coating materials, plastics, or cosmetics.

Surface-Modifying Additives
Use of the Copolymers as Additives

The copolymers of the invention can be used as additive, such as wetting and dispersing agent, leveling agent, defoamer, stabilizer, or dirt- and oil-repellent agent, in coating materials, plastics, cosmetics, or homogeneous dispersions, such as pigment and filler preparations. By plastics are meant polymeric molding compounds and thermoplastics.

The copolymers can be used for example as leveling agents in coating materials, in order for example to improve the optical qualities of the resultant coating. Through the use of these copolymers as leveling agents it is also possible for example to improve the gloss and/or the opalescence of the coating materials or coatings, or plastics.

The copolymers can for example also be used in order to modify the surface properties of coatings, polymeric molding compounds, and thermoplastics. Through the addition of the copolymers it is possible to influence the surface energy of coatings, polymeric molding compounds, and thermoplastics. The surface may be made more hydrophilic or else more hydrophobic, thereby improving or else diminishing the adhesion to this surface, allowing dirt-repelling, easy-to-clean surfaces to be obtained. Generally speaking, an increase in the surface energy produces more hydrophilic surfaces, which can be wetted more readily and which afford better adhesion conditions. Generally speaking, in contrast, a reduction in the surface energy produces more hydrophobic surfaces, which are more difficult to wet and have dirt-repelling, antiadhesive properties.

Additives for Producing Dirt-Repelling, Antiadhesive Surfaces

Through the addition of the copolymers of the invention to coating materials, polymeric molding compounds, and thermoplastics it is possible to produce dirt-repelling, easy-to-clean, antiadhesive surfaces. In the corresponding copolymers, the hydrophobic silicone fractions lead to the target properties, while the backbone and possible more hydrophilic groups contribute to compatibility, although the fraction of the hydrophobic groups is predominant, in order to produce a dirt-repelling effect. In addition to the polysiloxane groups present, it is also possible for the copolymers, for example, to contain comparatively more hydrophobic groups such as perfluoro groups, for example. Such copolymers typically also induce a drastic reduction in the surface energy.

Coating materials, polymeric molding compounds, and thermoplastics to which such copolymers are added exhibit excellent antiadhesive and dirt-repelling properties. Such coating material compositions are preferably compositions for producing antigraffiti coatings, release coatings, self-cleaning façade coatings, ice-repellent coatings, such as for aircraft, automobile wheel coatings, dirt-repelling machine and instrument coatings, marine coatings (antifouling coatings), dirt-repelling furniture coatings, and release paper coatings.

In view of the extremely antiadhesive effect of the coating material compositions of the present invention, even oily substances, such as mineral oils, vegetable oils, or oily preparations, for example, can be repelled, and so containers coated accordingly can be emptied completely of these fluids. Accordingly, the coating material compositions to which the additives of the invention have been admixed are suitable for coating interior can surfaces or interior container surfaces. Furthermore, on account of the extremely broad compatibility of the copolymers, they are also suitable for the production of transparent coating materials.

The copolymers do not adversely affect the other properties, such as weather resistance or mechanical resistance, for example, of the coating materials or coatings, polymeric molding compounds, or thermoplastics. The copolymers of the invention can be added to the coating materials, polymeric molding compounds, or thermoplastics in relatively small amounts (additive amounts). Especially in coating materials and plastics, such as polymeric molding compounds and thermoplastics, the copolymers may preferably also be used in relatively small amounts of 0.01 to 5 wt. %, preferably of 0.02 to 2 wt. %, and more preferably of 0.03 to 1 wt. %, based in each case on the overall composition of the coating material or of the overall plastic.

The physical properties of the original coating materials or coatings, polymeric molding compounds, and thermoplastics, in respect for example of corrosion control, gloss retention, and weathering resistance, are not, or not substantially, impaired by the low concentrations of the additive. Coating materials or coatings, polymeric molding compounds, and thermoplastics comprising the copolymers generally display the desired properties even over a period of several years, and also retain these properties over a plurality of cleaning cycles.

Where the copolymers contain free hydroxyl groups, it has been found particularly advantageous that the hydroxyl groups of the copolymers crosslink with reactive groups of the binder and hence a durable effect by the copolymers is ensured.

Additives for Producing Readily Wettable Surfaces

The copolymers can be added to coating materials, polymeric molding compounds, and thermoplastics, so that the addition thereof increases the surface energy of the coatings, polymeric molding compounds, and thermoplastics, thereby improving the wettability of these surfaces. In the corresponding copolymers, the fraction of hydrophilic groups is dominant in comparison to the hydrophobic groups. The overall character of the copolymer is hydrophilic. In these copolymers, small amounts of hydrophobic polysiloxane groups lead to an orientation of the copolymers to the surface of hydrophilic media, and the dominant fraction of hydrophilic groups is then able to result in an increase in the surface energy. Accordingly, copolymers suitable for increasing the surface energy contain, in addition to the polysiloxane groups that are present, comparatively hydrophilic groups as well, based for example on alkoxylated compounds.

Coatings, polymeric molding compounds, and thermoplastics to which such copolymers are added have excellently wettable surfaces. The wettability can be ascertained by using the customary techniques that determine the contact angle of the surface with respect to water. For hydrophilic surfaces, the contact angle is to be <60°. The copolymers do not substantially detract from the other properties, such as, for example, weather resistance or mechanical resistance, of the coating materials or coatings, polymeric molding compounds, or thermoplastics. These copolymers can be added to the coating materials, polymeric molding compounds, or thermoplastics in relatively small amounts (additive amounts), as for example in amounts of 0.01 to 5 wt. %, preferably of 0.02 to 2 wt. %, and more preferably of 0.03 to 1 wt. %, based in each case on the overall composition of the coating material or of the overall plastic.

The physical properties of the original coating materials or coatings, polymeric molding compounds, and thermoplastics, in respect for example of corrosion control, gloss retention, and weathering resistance, are not adversely affected, or are adversely affected only insubstantially, by the low concentrations of the additive. Coating materials or coatings, polymeric molding compounds, and thermoplastics comprising the copolymers generally display the desired properties even over a period of several years, and also retain these properties over a plurality of cleaning cycles.

Where the copolymers still bear hydroxyl groups, it is found particularly advantageous that the hydroxyl groups of the copolymers are able to crosslink with reactive groups of the binder and thus ensure a durable effect.

Through the use of the copolymers as additives in coating materials, polymeric molding compounds, or thermoplastics, it is also possible to obtain surfaces having antistatic properties or antifogging properties. Surfaces additized accordingly can be wetted very well and may optionally exhibit adhesion-promoting properties when recoated.

Wetting and Dispersing Agents

The copolymers can also be used as dispersants, specifically in the fields of dispersant use known from the prior art, in which case the copolymers of the invention are employed as dispersants instead of or together with the prior-art dispersants. Thus, for example, they may be used in the production or processing of paints, colorants for leather and for textiles, pastes, pigment concentrates, or cosmetic preparations, especially if these products comprise solids such as pigments and/or fillers.

In one aspect of the present invention, it relates to a process for producing a homogeneous dispersion, said process comprising the mixing of at least one pigment and/or filler in a vehicle selected from the group consisting of at least one silicone oil, with the aid of at least one copolymer of the invention. These dispersions represent preferably pigment preparations and/or filler preparations, which are used preferably for coating systems. Homogeneous in this context means that to the naked eye there is no discernible phase separation or nonuniformity. The various constituents are evenly distributed within the homogeneous dispersion.

A further aspect of the present invention relates to a silicone-crosslinked product or coating material which comprises the aforementioned homogeneous dispersion, and to a process for coating by mixing the aforementioned homogeneous dispersion and a reactive silicone and curing the mixture to give a pigmented/filled, silicone-crosslinked product or coating.

The reactive silicones or binders may be present in a multiplicity of forms and compounds, such as, for example, as silicone oils, silicone with high solids, water-based silicones, silicon alkyds, siliconized polyesters, or siliconized acrylic resins. Crosslinking may take place by moisture curing, hydrosilylation curing, radiation curing, or a combination of radiation and thermal curing (dual cure).

Pigments

Pigments are colorants in powder or flake form which in contrast to dyes are insoluble in the surrounding medium (in this regard cf. DIN 55943: 2001-10, Römpp Lexikon Lacke and Druckfarben, Georg Thieme Verlag 1998, entries: Colorants, Dyes, Pigments).

Pigments for the purposes of this invention are, for example, organic and inorganic pigments, pigmentary carbon blacks, effect pigments, such as pearlescent pigments and/or metallic effect pigments, for example, sparkle pigments, and mixtures thereof.

Suitable organic pigments include, for example, nitroso, nitro, azo, xanthene, quinoline, anthraquinone, phthalocyanine, metal complex, isoindolinone, isoindoline, quinacridone, perinone, perylene, diketopyrrolopyrrole, thioindigo, dioxazine, triphenylmethane, and quinophthalone compounds. The organic pigments may further be selected, for example, from the following: carmine, carbon black, aniline black, azo yellow, quinacridone, phthalocyanine blue. Examples thereof are: D & C Red 21 (CI 45 380), D & C Orange 5 (CI 45 370), D & C Red 27 (CI 45 410), D & C Orange 10 (CI 45 425), D & C Red 3 (CI 45 430), D & C Red 7 (CI 15 850), D & C Red 4 (CI 15 510), D & C Red 33 (CI 17 200), D & C Red 34 (CI 15 880), D & C Yellow 5 (CI 19 140), D & C Yellow 6 (CI 15 985), D & C Green (CI 61 570), D & C Yellow 10 (CI 77 002), D & C Green 3 (CI 42 053) and/or D & C Blue 1 (CI 42 090).

Suitable inorganic pigments include, for example, metal oxides and other metal compounds which are of low solubility or at least substantially insoluble in water, more particularly oxides of titanium, as for example titanium dioxide (CI 77891), of zinc, of iron, as for example red and black iron oxide (CI 77491 (red), 77499 (black)), or iron oxide hydrate (CI 77492, yellow), of zirconium, of silicon, of manganese, of aluminum, of cerium, and of chromium, and also mixed oxides of the stated elements, and mixtures thereof. Further suitable pigments are barium sulfate pigments, zinc sulfide pigments, manganese violet pigments, ultramarine blue pigments, and Prussian blue pigments. The pigments may be surface-modified, in which case the surfaces as a result of the modification may feature, for example, hydrophilic, amphiphilic, or hydrophobic compounds and/or groups. The surface treatment may involve the pigments being provided, by processes known for the skilled person, with a thin hydrophilic and/or hydrophobic, organic and/or inorganic coat.

With regard to pearlescent pigments, use may be made, for example, of the types or kinds of pearlescent pigments that are listed below:

natural pearlescent pigments, such as pearl essence (mixed guanine/hypoxanthine crystals from fish flakes) and mother-of-pearl (ground mussel shells), monocrystalline pearlescent pigments, such as bismuth oxychloride (BiOCl) or platelet-shaped titanium dioxide, and layer-substrate pearlescent pigments.

Suitable platelet-shaped transparent substrates for coating for the layer-substrate pearlescent pigments are nonmetallic, natural, or synthetic platelet-shaped substrates. The substrates are preferably substantially transparent, more preferably transparent, i.e., at least partly transmissive for visible light.

These platelet-shaped transparent substrates may be selected from the group of natural mica, synthetic mica, glass flakes, $SiO_2$ platelets, $Al_2O_3$ platelets, sericite, kaolin, graphite, talc, polymer platelets, platelet-shaped bismuth oxychloride, platelet-shaped substrates which comprise a hybrid organic-inorganic layer, and mixtures thereof.

Synthetic substrates, such as glass flakes or synthetic mica, for example, have smooth surfaces and also a uniform thickness within an individual substrate particle. The surface therefore presents only few scattering centers for incident and/or reflected light, and hence, after coating, allows pearlescent pigments which have a greater luster than with natural mica as the substrate. Glass flakes used are preferably those which can be produced by the processes described in EP 0 289 240 A1, WO 2004/056716 A1, and WO 2005/063637 A1 and/or which have the glass composition known from EP 1 980 594 B1.

The pearlescent pigments may also have platelet-shaped transparent substrates, examples being glass flakes, which have been coated in particular on both sides with semitransparent metal layers. The metals of the semitransparent metal layers are preferably selected from the group of silver, aluminum, chromium, nickel, gold, platinum, palladium, copper, zinc, titanium, and also the mixtures and alloys thereof.

The platelet-shaped transparent substrate may be provided with at least one optically active layer or coating, the layers preferably comprising metal oxides, metal oxide hydrates, metal hydroxides, metal suboxides, metals, metal fluorides, metal oxyhalides, metal chalcogenides, metal nitrides, metal oxynitrides, metal sulfides, metal carbides, and mixtures thereof. In accordance with one preferred embodiment of the present invention, the optically active layers or coatings consist of the aforementioned materials.

If a layer or coating of high refractive index is applied to the platelet-shaped transparent substrate, the refractive index is situated more particularly at n≥1.8, preferably at n≥1.9, and more preferably at n≥2.0. In the case of a coating or layer of low refractive index, the refractive index is situated in particular at n<1.8, preferably at n<1.7, and more preferably at n<1.6.

Examples of a suitable high-index layer or coating include $TiO_2$, $Fe_2O_3$, $Fe_3O_4$, $TiFe_2O_5$, $FeTiO_3$, ZnO, $SnO_2$, CoO, $Co_3O_4$, $ZrO_2$, $Cr_2O_3$, $VO_2$, $V_2O_3$, $Sb_2O_3$, $SnO_2$, $SbO_2$, and mixtures thereof. Preference is given to using $TiO_2$ and/or $Fe_2O_3$. Examples of a suitable low-index layer or coating include $SiO_2$, $Al_2O_3$, $MgF_2$, and mixtures thereof.

The platelet-shaped transparent substrates of the pearlescent pigments may be coated with a single-ply or multi-ply layer construction composed of metal oxides, metal hydroxides, metal suboxides, and/or metal oxide hydrates, and the sequence of the layers may be variable. The metal oxides, metal hydroxides, metal suboxides and/or metal oxide hydrates may also be present alongside one another in the same layer.

Where the platelet-shaped transparent substrate is coated with only one single metal oxide layer, that layer preferably has a high refractive index. Depending on the geometric thickness of the metal oxide layer, pearlescent pigments of these kinds may produce different color effects. For example, silver-white pearlescent pigments with a $TiO_2$ covering and a geometric $TiO_2$ layer thickness of 40 to 60 nm have the color silver; interference pigments with a $TiO_2$ covering and a geometric $TiO_2$ layer thickness of 60 to 80 nm have the color yellow; of 80 to 100 nm, the color red; of 100 to 140 nm, the color blue; of 120 to 160 nm, the color green; and of 280 to 320 nm, the color green (IIIrd order); color gloss pigments with an $Fe_2O_3$ covering and a geometric $Fe_2O_3$ layer thickness of 35 to 45 nm have the color bronze; of 45 to 55 nm, the color copper; of 55 to 65 nm, the color red; of 65 to 75 nm, the color red-violet; of 75 to 85 nm, the color red-green; and, with an $Fe_3O_4$ covering, the color black; combination pigments have gold tones with a $TiO_2/Fe_2O_3$ covering, the color green with a $TiO_2/Cr_2O_3$ covering; and the color deep blue with a $TiO_2$/Prussian blue coloring.

The platelet-shaped transparent substrates may also be coated with a multi-ply layer construction comprising or consisting of metal oxide, metal hydroxide, metal suboxide and/or metal oxide hydrate, and the sequence of the layers may be variable. Preference here is given to a layer sequence in which at least one high-index layer and at least one low-index layer are arranged in alternation on a substrate. With the alternating arrangement it is also possible for one or more high-index layers to be arranged immediately above one another, and subsequently for one or more low-index layers to be arranged immediately one above another. It is essential, though, that layers of high and low index occur within the layer construction. Preferably, starting from the substrate, there are at least one high-index layer, low-index layer, and high-index layer arranged again, resulting in pearlescent pigments having particularly intense interference colors.

Pearlescent pigments coated with $TiO_2$ and/or iron oxide and based on platelet-shaped natural mica are available commercially, for example, under the name Prestige from Eckart GmbH. Where the platelet-shaped transparent substrate is composed of synthetic mica, pearlescent pigments of this kind are available commercially, for example, under the trade name SynCrystal from Eckart GmbH. $TiO_2$- and/or $Fe_2O_3$- coated Al₂O₃ flakes and correspondingly coated SiO₂ flakes are available for example under the trade name Xirona from Merck KGaA. TiO₂- and/or iron oxide-coated glass flakes are available for example from Eckart GmbH under the name Mirage, from BASF Catalysts under the name Reflecks, or from Merck KGaA under the name Ronstar. Multilayer interference pigments as well, of the kind described in DE 196 18 569 A1, for example, and consisting of a support material coated with alternating layers of metal oxides of low and high refractive index, may be used for the purposes of the present invention.

Additionally possible for use are pigments featuring interference effect but having no substrate, examples being liquid crystals, such as Helicones, obtainable from LCP Technology GmbH, or particles with opalescent effect, consisting of monodisperse beads in a three-dimensional structure featuring close packing in domains and a regular arrangement, of the kind that are described in WO 2001/88044, for example. Furthermore, it is also possible for holographic sparkle pigments, such as geometry pigments from Spectratek, for example, fluorescent pigments, phosphorescent pigments, photochromic pigments, thermochromic pigments, and what are called "quantum dots", available for example from Quantum Dots Corporation, to be used.

Also possible for use, furthermore, are effect pigments known as sparkle pigments, which are available from Floratech for example under the trade name Metasomes Standard/Glitter in a variety of colors (yellow, red, green, blue). The glitter particles in this case may be present in mixtures with various auxiliaries and dyes (such as, for example, the dyes having the Colour Index (CI) numbers 19 140, 77 007, 77 289, and 77 491).

Besides pearlescent pigments, metallic effect pigments in particular, as well, may be employed in the context of the present invention.

The platelet-shaped metal substrate in that case may consist in particular of a pure metal and/or of a metal alloy. The metal substrate may be selected preferably from the group of silver, aluminum, iron, chromium, nickel, molybdenum, gold, copper, zinc, tin, stainless steel, magnesium, steel, bronze, brass, titanium, and the alloys and/or mixtures thereof. Preferably, however, the metal substrate is composed of aluminum (aluminum content preferably >99 wt. %, based on the metal substrate), copper (copper content preferably >99 wt. %, based on the metal substrate), and gold bronze (copper content for example 70 to 95 wt. %, zinc content for example 5 to 30 wt. %, based in each case on the metal substrate). The impurities present in the metallic substrates ought to be present in extremely small amounts, preferably <1 wt. %, based on the substrate.

The platelet-shaped metal substrate may have been given at least one aftercoat. This aftercoat may consist for example of metal oxides, metal hydroxides, or metal oxide hydrates, such as, for example, titanium dioxide, aluminum oxide, iron oxide, cerium oxide, chromium oxide, and silicon oxide, or mixtures thereof. The aftercoat preferably consists of at least one layer of silicon dioxide.

Metallic effect pigments stabilized in this way, as described in EP 1 532 213 B1 and also in EP 1 758 550 A2, are available for example under the brand name Visionaire from Eckart GmbH.

An extended color pallet for metallic effects is additionally offered, furthermore, by colored metallic effect pigments having a) a core of aluminum and also a coloring layer obtained by wet-chemical oxidation and composed of aluminum oxide and/or aluminum hydroxide and/or aluminum oxide hydrate, or
b) a core and also at least one metal oxide layer which comprises at least one color pigment.

Additionally colored metallic effect pigments, as well as the traditional gold and silver shades, also permit red shades, such as Visionaire Bright Red 7 and Visionaire Bright Red 34, for example; blue shades, such as Visionaire Bright Blue, for example; and also warm champagne shades, such as Visionaire Bright Champagne, for example. Such pigments are known for example from DE 195 01 307 A1, DE 195 20 312 A1, DE 103 61 436 A1, and DE 10 2006 006 716 A1, and are available commercially from Eckart GmbH.

It is also possible, moreover, to use metallic effect pigments that reflect infrared radiation and are described in WO 2007/076967, for example, possessing a core which reflects infrared radiation. The IR radiation-reflecting core is provided with an enveloping coating which is transparent for infrared rays. The infrared radiation-reflecting pigment is substantially white.

Besides these it is possible to use magnetic metallic effect pigments, such as, for example, platelet-shaped iron pigments which may have been stabilized using a passivating inhibitor layer or corrosion control layer. Pigments of these kinds are described in EP 1 251 152 B1, for example.

The pigments may be selected for example from the corresponding positive list of the Cosmetics Regulation (Regulation (EC) No. 1223/2009, Annex IV).

In a further embodiment, the pigments described may have been coated with at least one organic aftercoat, applied in a manner familiar to the skilled person.

Preferred aftercoating techniques include for example:
PEG-silicone coating, such as the "AQ" modification, available from LCW;
chitosan coating, such as the "CTS" modification, available from LCW;
triethoxycaprylylsilane coating, such as the "AS" modification, available from LCW;
methicone coating, such as the "SI" modification, available from LCW;
dimethicone coating, such as the "Covasil 3.05" modification, available from LCW;
dimethicone/trimethylsiloxysilicate coating, such as the "Covasil 4.05" modification, available from LCW;
lauryllysine coating, such as the "LL" modification, available from LCW;
lauryllysine-methicone coating, such as the "LL/SI" modification, available from LCW;
magnesium myristate coating, such as the modification, available from LCW;
aluminum dimyristate coating, such as the "MI" modification, available from Miyoshi;
perfluoropolymethyl isopropyl ether coating, such as the "FHC" modification, available from LCW;
disodium stearylglutamate coating, such as the "NAI" modification, available from Miyoshi;
perfluoroalkyl phosphate treatment, such as the "PF" modification, available from Daito;
acrylate/dimethicone and perfluoroalkyl phosphate treatment, such as the "FSA" modification, available from Daito;
polymethylhydrogensiloxane/perfluoroalkyl phosphate treatment, such as the "FS01" modification, available from Daito;

lauryllysine/aluminum tristearate treatment, such as the "LL-StAl" modification, available from Daito;

octyltriethylsilane coating, such as the "OTS" modification, available from Daito;

octyltriethylsilane/perfluoroalkyl phosphate coating, such as the "FOTS" modification, available from Daito;

acrylate-dimethicone copolymer coating, such as the "ASC" modification, available from Daito;

isopropyltitanium triisostearate coating, such as the "ITT" modification, available from Daito;

microcrystalline cellulose and carboxymethyl cellulose coating, such as the "AC" modification, available from Daito;

acrylate copolymer coating, such as the "APD" modification, available from Daito; and also perfluoroalkyl phosphate/isopropyltitanium triisostearate coating, such as the "PF+ITT" modification, available from Daito, for example.

The pigments may be present not only individually but also in a mixture and, furthermore, may have been mutually coated with one another.

In order to achieve specific color effects, it is possible in the context of the present invention, as well as the pigments described, to use further pigments and/or effect pigments and/or mixtures thereof, in variable proportions.

Silicone Oils

Examples of silicone oils include those of the following structures:

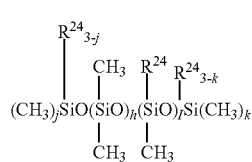
(III)

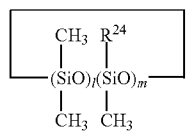
(IV)

$R^{26}_{4-z}Si(OSi(CH_3)_3)_z$ (V)

where $R^{24}$ is selected from the group consisting of hydrogen, a hydroxyl group, alkyl or fluorinated alkyl groups having 2 to 20 carbon atoms, aryl groups, aminoalkyl groups, $C_{6-22}$ alkoxy groups, and a group of the formula $(CH_3)_3SiO[(CH_3)_2SiO]_ySi(CH_3)_2CH_2CH_2$—, in which y is an integer from 0 to 500. $R^{25}$ is a $C_{1-20}$ alkyl group. In formula (III), h is an integer from 0 to 1000, i is an integer from 0 to 1000, with the proviso that h+i is 1 to 2000, and each j and k independently of one another is 0, 1, 2, or 3. In formula (IV) l and m are integers from 0 to 8, with l+m ranging from 3 to 8, and in formula (V), z is an integer from 1 to 4. Examples of the radical $R^{24}$ include methyl, ethyl, propyl, butyl, hexyl, octyl, decyl, dodecyl, tetradecyl, hexadecyl, octadecyl, trifluoropropyl, nonafluorohexyl, heptadecylfluorodecyl, phenyl, aminopropyl, dimethylaminopropyl, aminoethylaminopropyl, stearoxy, butoxy, ethoxy, propoxy, cetyloxy, myristyloxy, styryl, and alpha-methylstylyl, among which preference is given to hexyl, octyl, decyl, dodecyl, tetradecyl, hexadecyl, octadecyl, trifluoropropyl, phenyl, aminopropyl, and aminoethylaminopropyl. Examples of the silicone oil include organopolysiloxanes with low or high viscosity, such as dimethylpolysiloxane, methylphenylpolysiloxane, methylhydrogenpolysiloxane, and dimethyl siloxane-methylphenylsiloxane copolymer, for example; cyclosiloxanes, such as octamethylcyclotetrasiloxane (D4), decamethylcyclopentasiloxane (D5), dodecamethylcyclohexasiloxane (D6), tetramethyltetrahydrogencyclotetrasiloxane (H4), and tetramethyltetraphenylcyclotetrasiloxane; tris-trimethylsiloxysilane (M3T), tetrakistrimethylsiloxysilane (M4Q); branched siloxanes, such as tristrimethylsiloxypropylsilane, tristrimethylsiloxy-butylsilane, tristrimethylsiloxyhexylsilane, and tristrimethylsiloxyphenylsilane, for example; higher alcohol-modified silicones, such as steroxysilicone; alkyl-modified silicones, amino-modified silicones, and fluoro-modified silicones.

Applications

The dispersions of pigment and/or filler in silicone oil in accordance with the present invention can be used in a wide range of formulations, including resins, oils, greases, lubricants, rubber materials, sealants, adhesives, waxes, or coating material compositions. The dispersions may also be used in formulations which are produced in the body care industry, or in electrical applications in the electronics industry, in the marine industry, for medical applications, in the construction industry, or in the automotive industry. Examples include cosmetic products, electronic paper, such as, for example, the display in E-books, the encapsulation of microelectronic chips, submarine skin coatings, such as, for example, antifouling coatings, silicone tubes, or lubricity additives for brake components.

The copolymers may be used in relatively wide amounts of 0.01 to 90 wt. %, preferably 1 to 50 wt. %, very preferably 2 to 40 wt. %, in each case based on the overall composition of the homogeneous dispersion, in the homogeneous dispersions. The homogeneous dispersions are preferably pigment and filler preparations.

Additionally provided with the present invention are paints, pastes, and molding compounds comprising the copolymers of the invention and one or more pigments, organic solvents and/or water, and also, optionally, binders and customary coatings auxiliaries.

Additionally provided by the invention are coating materials, plastics, or homogeneous dispersions comprising at least one copolymer of the invention. In this case the copolymer fraction is preferably 0.01 to 5 wt. %, more preferably 0.02 to 2 wt. %, and very preferably 0.03 to 1 wt. %, based in each case on the overall composition of the coating material or of the plastic, in coating materials or plastics, or in homogeneous dispersions, such as pigment and filler preparations, preferably 0.01 to 90 wt. %, more preferably 1 to 50 wt. %, very preferably 2 to 40 wt. %, based in each case on the overall composition of the homogeneous dispersion.

EXAMPLES

Abbreviations, Trade Names

IPDI=Isophorone diisocyanate
TDI=Toluene 2,4-diisocyanate
DBTL=Dibutyltin dilaurate
PMI=Polymolecularity index
Grilonit RV 1812=Hexane 1,6-glycidyl ether from EMS-CHEMIE AG
D.E.R. 332 Epoxy Resin=Bisphenol A diglycidyl ether from The Dow Chemical Company Measurement Methods:
Gel Permeation Chromatography (GPC)

The gel permeation chromatography was carried out at 40° C. with a high-pressure liquid chromatography pump (Bischoff HPLC 2200) and a refractive index detector (Waters 419). The eluent used was tetrahydrofuran, with an elution rate of 1 ml/min. Calibration was carried out using polystyrene standards. The number-average molecular weight Mn, the weight-average molecular weight Mw, and the polymolecularity index PMI=Mw/Mn were calculated using the NTeqGPC program.

NMR Spectroscopy

NMR measurements were carried out using an NMR instrument (Bruker DPX 300) at 300 MHz ($^1$H) or 75 MHz ($^{13}$C). The solvents used were deuterated chloroform and deuterated dimethyl sulfoxide.

Determination of NCO Content

The NCO content is determined quantitatively by reacting the NCO groups of the isocyanates with an excess of dibutyl amine to form urea derivatives and then back-titrating the excess amine with HCl. The NCO content indicates the amount of isocyanate in wt. %.

Hydroxyl Number

Alcoholic hydroxyl groups are reacted by acetylation with an excess of acetic anhydride. The excess acetic anhydride is subsequently cleaved to form acetic acid by addition of water, and back-titrated using ethanolic KOH. The hydroxyl number is the amount of KOH, in mg, which is equivalent to the amount of acetic acid bound in acetylating 1 g of substance.

Amine Number

Amine-containing substances are titrated with HCl. The amine number is the amount of KOH in mg that corresponds to the amine fraction of 1 g of substance.

Synthesis Examples

The invention is illustrated by the examples below. Unless otherwise indicated, parts and percentages should be understood as parts by weight and percentages by weight, respectively. When substances without molecular uniformity are employed, the stated molecular weights are number-average molecular weights.

Mono-SiH-functional polysiloxanes are prepared in accordance with the process described in the literature (T. Suzuki, Polymer, 30 (1989) 333).

Example 1

Synthesis of Monoamino-Functional Polysiloxane (B)

A four-neck flask fitted with stirrer, thermometer, dropping funnel, reflux condenser, and nitrogen inlet tube is charged with mono-SiH-functional polysiloxane (250 g, Mn≈2000 g/mol) and Karstedt catalyst (4.38 g, 0.2% dilution in xylene), and this initial charge is mixed thoroughly and heated to 100° C. Allylamine (9.29 g) is added dropwise over 30 minutes. The reaction of the mono-SiH-functional polysiloxane is monitored by means of gas-volumetric determination. Following complete reaction, the excess allylamine is removed by distillation. The amine number measured for the product is 24.1 mg KOH/g.

Example 2

Synthesis of Monoamino-Functional Polysiloxane (B)

A four-neck flask fitted with stirrer, thermometer, dropping funnel, reflux condenser, and nitrogen inlet tube is charged with mono-SiH-functional polysiloxane (1500 g, Mn≈4500 g/mol) and Karstedt catalyst (6.56 g, 0.8% dilution in xylene), and this initial charge is mixed thoroughly and heated to 100° C. Allylamine (39.8 g) is added dropwise over 30 minutes. The reaction of the mono-SiH-functional polysiloxane is monitored by means of gas-volumetric determination. Following complete reaction, the excess allylamine is removed by distillation. The amine number measured for the product is 10.1 mg KOH/g.

Example 3

Synthesis of Monohydroxy-Functional Polysiloxane

A four-neck flask fitted with stirrer, thermometer, dropping funnel, reflux condenser, and nitrogen inlet tube is charged with mono-SiH-functional polysiloxane (300 g, Mn≈2000 g/mol) and Karstedt catalyst (0.75 g, 0.2% dilution in xylene), and this initial charge is heated to 55° C. Allylglycol (19.9 g) is metered in at a rate such that the temperature does not exceed 75° C. The reaction of the mono-SiH-functional polysiloxane is monitored by means of gas-volumetric determination. Following complete reaction, the excess allylglycol is removed by distillation. The hydroxyl number measured for the product is 25.2 mg KOH/g.

Example 4

Synthesis of Monoisocyanate-Functional Polysiloxane (C)

A four-neck flask fitted with stirrer, thermometer, dropping funnel, reflux condenser, and nitrogen inlet tube is charged with IPDI (114.8 g), xylene (20.8 g), DBTL (0.83 g in 7.5 g of xylene) and benzoyl chloride (0.2 g). The hydroxy-functional polysiloxane from example 3 (300 g) is added dropwise at room temperature at a rate such that the temperature does not exceed 30° C. The reaction conversion is ascertained by titrimetric determination of the isocyanate content. Following complete reaction of the hydroxy-functional polysiloxane, the remaining IPDI is removed by distillation on a thin-film evaporator. The NCO content measured for the product is 1.63 wt. %.

Example 5

Synthesis of a Monoisocyanato-Functional Polyether

A four-neck flask fitted with stirrer, thermometer, dropping funnel, reflux condenser, and nitrogen inlet tube is charged with TDI (114.4 g). Methoxypolyethylene glycol 350 (70 g) is added dropwise at 50° C. at a rate such that the temperature does not exceed 55° C. This is followed by stirring at 55° C. for 3 hours more. Following complete reaction of the hydroxy-functional methoxypolyethylene glycol, the remaining TDI is removed by distillation on a thin-film evaporator. The NCO content measured for the product is 8 wt. %.

Example 6

Synthesis of a Copolymer Containing Polysiloxane Groups

A four-neck flask fitted with stirrer, thermometer, dropping funnel, reflux condenser, and nitrogen inlet tube is charged with the monoamino-functional polysiloxane from example 1

(376.3 g) and Grilonit RV 1812 (22.8 g) and this initial charge is heated to 140° C. under nitrogen. The epoxide conversion is monitored by means of $^1$H NMR. Following quantitative conversion of the epoxide group, the reaction is discontinued. GPC shows $M_n$=5500 g/mol and PMI=2.0.

Example 7

Synthesis of a Copolymer Containing Polysiloxane Groups

A four-neck flask fitted with stirrer, thermometer, dropping funnel, reflux condenser, and nitrogen inlet tube is charged with the monoamino-functional polysiloxane from example 1 (48.4 g) and Grilonit RV 1812 (32.8 g) and this initial charge is heated to 140° C. under nitrogen. After a reaction time of 2 hours, hexylamine is slowly added dropwise with stirring. The epoxide conversion is monitored by means of $^1$H NMR. Following quantitative conversion of the epoxide group, the reaction is discontinued. GPC shows $M_n$=3100 g/mol and PMI=3.2.

Example 8

Synthesis of a Copolymer Containing Polysiloxane Groups

A four-neck flask fitted with stirrer, thermometer, dropping funnel, reflux condenser, and nitrogen inlet tube is charged with the monoamino-functional polysiloxane from example 1 (25.1 g) and Grilonit RV 1812 (34.0 g) and this initial charge is heated to 140° C. under nitrogen. After a reaction time of 2 hours, oleylamine is slowly added dropwise with stirring. The epoxide conversion is monitored by means of $^1$H NMR. Following quantitative conversion of the epoxide group, the reaction is discontinued. GPC shows $M_n$=2700 g/mol and PMI=2.3.

Example 9

Synthesis of a Copolymer Containing Polysiloxane Groups

A four-neck flask fitted with stirrer, thermometer, dropping funnel, reflux condenser, and nitrogen inlet tube is charged with the monoamino-functional polysiloxane from example 2 (53.5 g), Grilonit RV 1812 (27.6 g), and xylene (26.3 g) and this initial charge is heated to 140° C. under nitrogen. After a reaction time of 2 hours, ethanolamine (6.5 g) is slowly added dropwise with stirring. The epoxide conversion is monitored by means of $^1$H NMR. Following quantitative conversion of the epoxide group, the reaction is discontinued.

Example 10

Synthesis of a Copolymer Containing Polysiloxane Groups

A four-neck flask fitted with stirrer, thermometer, dropping funnel, reflux condenser, and nitrogen inlet tube is charged with the monoamino-functional polysiloxane from example 2 (48.4 g), Grilonit RV 1812 (12.5 g), and xylene (14.5 g) and this initial charge is heated to 140° C. under nitrogen. After a reaction time of 2 hours, oleylamine (11.6 g in solution in 7.3 g of xylene) is slowly added dropwise with stirring. The epoxide conversion is monitored by means of $^1$H NMR. Following quantitative conversion of the epoxide group, the reaction is discontinued. The hydroxyl number measured for the product is 58.3 mg KOH/g. GPC shows $M_n$=3000 g/mol and PMI=5.7.

Example 11

Synthesis of a Copolymer Containing Polysiloxane Groups

A four-neck flask fitted with stirrer, thermometer, dropping funnel, reflux condenser, and nitrogen inlet tube is charged with the monoamino-functional polysiloxane from example 2 (55.0 g), Grilonit RV 1812 (14.2 g), and xylene (14.8 g) and this initial charge is heated to 140° C. under nitrogen. After a reaction time of 3 hours, hexylamine (5.0 g in solution in 7.4 g of xylene) is slowly added dropwise with stirring. The epoxide conversion is monitored by means of $^1$H NMR. Following quantitative conversion of the epoxide group, the reaction is discontinued. GPC shows $M_n$=2600 g/mol and PMI=7.6.

Example 12

Synthesis of a Copolymer Containing Polysiloxane Groups

A four-neck flask fitted with stirrer, thermometer, dropping funnel, reflux condenser, and nitrogen inlet tube is charged with oleylamine (17.0 g) and Grilonit RV 1812 (14.9 g) and this initial charge is heated to 140° C. under nitrogen. After a reaction time of 3 hours, DBTL (10 mg) is added and monoisocyanate-functional polysiloxane from example 4 (11.8 g) is metered in slowly with stirring. GPC shows $M_n$=3800 g/mol and PMI=2.1.

Example 13

Synthesis of a Modified Copolymer Containing Polysiloxane Groups

A four-neck flask fitted with stirrer, thermometer, dropping funnel, reflux condenser, and nitrogen inlet tube is charged with the polysiloxane copolymer from example 8 (60 g), the monoisocyanato-functional polyether from example 5 (6.83 g), and DBTL (0.06 mg) and this initial charge is heated to 120° C. under nitrogen. After a reaction time of 5 hours, the reaction is discontinued. The hydroxyl number measured for the product is 45.5 mg KOH/g. GPC shows $M_n$=3800 g/mol and PMI=5.6.

Example 14

Synthesis of a Copolymer Containing Polysiloxane Groups

A four-neck flask fitted with stirrer, thermometer, dropping funnel, reflux condenser, and nitrogen inlet tube is charged with the monoamino-functional polysiloxane from example 1 (60 g) and D.E.R. 332 Epoxy Resin (7.2 g) and this initial charge is heated to 140° C. under nitrogen. The epoxide conversion is monitored by means of $^1$H NMR. Following quantitative conversion of the epoxide group, the reaction is discontinued. GPC shows $M_n$=15 800 g/mol and PMI=5.4.

Application Examples

A) Testing on Dirt-Repelling Surfaces

The additives were tested in two different systems and assessed for their dirt and oil repellency effect in accordance with the following criteria:

Visual Assessment of Coating Surface:
The coating surface was inspected for film haze, leveling, and surface defects, such as foam, craters, gel specks, and incompatibilities.
Evaluation: 1-5
1=Coating surface without hazing or without surface defects
5=Hazy coating surface or coating surface with numerous surface defects Edding Test:
The coating surface was written on using an Edding 400 permanent marker, and inspected to see whether it was writable. An assessment was made of whether the ink spreads over the surface or contracts. After the ink had dried, an attempt was made to remove it by wiping with a dry cloth.
Evaluation: 1-5
1=Ink contracts, can be removed without residue with a paper towel
5=Ink spreads very well over substrate, is virtually impossible to remove Mineral Oil Run Test:
A drop of commercial mineral oil was applied to the coating surface. The coated surface was then tipped until the drop had run approximately 10 cm. After 1 minute, an inspection was made to evaluate the oil track or drop reformation.
Evaluation: 1-5
1=The oil track immediately reforms into individual drops
5=The oil track does not reform, but instead spreads possibly wider Soiling with Bayferrox Powder:
The coating surface was sprinkled with 3 teaspoons (~15 g) of Bayferrox 130M, iron oxide pigment, Bayer AG, and rinsed off again with distilled water from a spray bottle in five sprayings. The surface, as far as possible without residue, was inspected.
Evaluation: 1-5
1=Bayferrox powder can be washed off without residue using water
5=No cleaning effect on washing with water; a large red spot remains

| 1) Test system: 2C PU topcoat Composition (figures in parts by weight) | |
| --- | --- |
| Component A | |
| Desmophen NH1520 (amino-functional binder, Bayer MaterialScience AG) | 32.1 |
| Desmophen NH1420 (amino-functional binder, Bayer MaterialScience AG) | 48.5 |
| Butyl acetate | 13.4 |
| MPA | 2.5 |
| DBTL solution (1% in butyl acetate) | 3.4 |
| Additive | 0.5 |
| Component B | |
| Desmodur N3600 (aliphatic polyisocyanate, Bayer MaterialScience AG) | 57.3 |

The additives from examples 7, 8, and 13, and BYK Silclean 3700 (initial mass relative to the solids fraction), are first of all stirred by hand into component A and mixed subsequently for 10 minutes using a Scandex shaker. One day after shaking, the additized coatings together with component B are drawn down onto a glass plate, using a 100 µm four-way bar applicator. Two glass plates are prepared for each additized coating.

The results obtained are set out in the following table.

| | Foam | Haze | Leveling | Craters | Edding | Oil | Bayferrox |
| --- | --- | --- | --- | --- | --- | --- | --- |
| No additive | 1 | 1 | 2 | 1 | 5 | 3 | 3 |
| BYK Silclean 3700* | 4 | 1 | 4 | 1 | 2 | 1 | 1 |
| Example 13 | 1 | 2 | 2 | 2 | 3 | 2 | 3 |
| Example 7 | 1 | 2 | 2 | 1 | 2 | 1 | 1.5 |
| Example 8 | 1 | 1 | 2 | 1 | 2 | 1 | 2 |

*BYK Silclean 3700 is a surface additive for improving the cleanability, from BYK-Chemie GmbH, with a solids fraction of 25 wt. % in MPA The use of the polymers from examples 7, 8, and 13 shows no, or no substantial, adverse effect on foaming, haze, leveling, and craters in the solid film, in comparison to the system with no additive. BYK Silclean 3700, in contrast, leads to leveling defects and to the formation of air bubbles in the solid film. In addition to the good results for foaming, haze, leveling, and craters, inventive examples 7, 8, and 13 exhibit an improvement in dirt and oil repellency properties that is of a similar quality to that of the commercial product. In the Edding test, in particular, inventive examples 7, 8, and 13 show improved values by comparison with the system with no additive. Consequently, the inventive examples achieve a very advantageous balance between the various properties, the balance being particular noteworthy between good leveling, low level of development of air bubbles, and, additionally, good dirt and oil repellency effect.

| 2) Test system: Acrylate-melamine baking varnish, clear Composition (figures in parts by weight) | |
| --- | --- |
| Setalux 1756 VV-65 (acrylate baking resin, Nuplex Resins) | 60 |
| Setamine US 138 BB-70 (amino baking resin, Nuplex Resins) | 24 |
| Shellsol A | 8 |
| Xylene | 8 |
| Additive | 0.05 |

The additives from examples 9, 10, and 11, and BYK Silclean 3700 (initial mass relative to the solids fraction), are first of all stirred in by hand and then mixed for 10 minutes with a Scandex shaker. One day after shaking, the additized coatings are drawn down onto a glass plate, using a 100 µm four-way bar applicator. After a flash-off time of 10 minutes, the glass plates are baked at 140° C. for 25 minutes. Two glass plates in each case are prepared from each additized coating.

The results obtained are set out in the following table.

| | Haze | Leveling | Craters | Edding | Oil |
| --- | --- | --- | --- | --- | --- |
| No additive | 1 | 1 | 1 | 4 | 3 |
| BYK Silclean 3700* | 1 | 1 | 2 | 2 | 2 |
| Example 9 | 2 | 1 | 2 | 1 | 2 |
| Example 10 | 1.5 | 1 | 1 | 2 | 1 |
| Example 11 | 1 | 1 | 1 | 2 | 2 |

*BYK Silclean 3700 is a surface additive for improving the cleanability, from BYK-Chemie GmbH, with a solids fraction of 25 wt. % in MPA The results show that through the use of the copolymers from examples 9, 10, and 11 as additives the dirt- and oil-repellent surfaces obtained are as good as or better than those obtained with commercial products.

b) Dispersing of Pigments

Examples for the Production of Pigment Preparations

In accordance with table 1, in each case for a batch size of 100 g, the first item was introduced and the further items were weighed out individually, with stirring, into a 250 ml glass with a screw top. Following addition of the same amount of 1 mm glass beads, dispersion took place for 2 hours by means of a shaker (LAU Disperser) at cooling setting 2. Following the dispersing operation, the glass beads were separated off on a 240 µm sieve (F4000 folding sieve).

As comparative examples to the prior art, pigment preparations were produced with and without a commercial dispersing additive based on a silicone acrylate, and also with a commercial product based on a polyether-modified polysiloxane.

Table 2 lists the viscosities of the pigment preparations.

TABLE 1.1

|  | Example | | |
|---|---|---|---|
|  | 1 [wt. %] | 2 [wt. %] | 3 [wt. %] |
| Baysilone oil PN 200 | 25.00 | 22.75 | 22.75 |
| Dowanol PM | 25.00 | 22.75 | 22.75 |
| Copolymer of example 6 |  | 4.50 |  |
| Dow Corning 5562 |  |  | 4.50 |
| Bayferrox red 130M | 50.00 | 50.00 | 50.00 |
|  | 100.00 | 100.00 | 100.00 |

The solids fraction of the copolymer of the invention or of the comparative compound is 9 wt. % relative to the pigment.

TABLE 1.2

|  | Example | | |
|---|---|---|---|
|  | 4 [wt. %] | 5 [wt. %] | 6 [wt. %] |
| Baysilone oil PN 200 | 25.00 | 23.75 | 23.75 |
| Dowanol PM | 25.00 | 23.75 | 23.75 |
| Copolymer of example 6 |  | 2.50 |  |
| Dow Corning 5562 |  |  | 2.50 |
| Kronos 2160 | 50.00 | 50.00 | 50.00 |
|  | 100.00 | 100.00 | 100.00 |

The solids fraction of the copolymer of the invention or of the comparative compound is 5 wt. % relative to the pigment.

TABLE 1.3

|  | Example | | | |
|---|---|---|---|---|
|  | 7 [wt. %] | 8 [wt. %] | 9 [wt. %] | 10 [wt. %] |
| Silicone oil D5 | 70.00 | 65.50 | 55.00 | 65.50 |
| Copolymer of example 6 |  | 4.50 |  |  |
| ShinEtsu KP-575 (30% in silicone oil D5) |  |  | 15.00 |  |
| Dow Corning 5562 |  |  |  | 4.50 |
| Irgalite Rubine 4BV | 30.00 | 30.00 | 30.00 | 30.00 |
|  | 100.00 | 100.00 | 100.00 | 100.00 |

The solids fraction of the copolymer of the invention or of the comparative compound is 15 wt. % relative to the pigment.

TABLE 1.4

|  | Example | | | |
|---|---|---|---|---|
|  | 11 [wt. %] | 12 [wt. %] | 13 [wt. %] | 14 [wt. %] |
| Silicone oil D5 | 60.00 | 54.00 | 40.00 | 54.00 |
| Copolymer of example 6 |  | 6.00 |  |  |
| ShinEtsu KP-575 (30% in silicone oil D5) |  |  | 20.00 |  |
| Dow Corning 5562 |  |  |  | 6.00 |
| PV Fast Blue BG | 40.00 | 40.00 | 40.00 | 40.00 |
|  | 100.00 | 100.00 | 100.00 | 100.00 |

The solids fraction of the copolymer of the invention or of the comparative compound is 15 wt. % relative to the pigment.

TABLE 1.5

|  | Example | | | |
|---|---|---|---|---|
|  | 15 [wt. %] | 16 [wt. %] | 17 [wt. %] | 18 [wt. %] |
| Silicone oil D5 | 80.00 | 77.00 | 70.00 | 77.00 |
| Copolymer of example 6 |  | 3.00 |  |  |
| ShinEtsu KP-575 (30% in silicone oil D5) |  |  | 10.00 |  |
| Dow Corning 5562 |  |  |  | 3.00 |
| Printex 35 | 20.00 | 20.00 | 20.00 | 20.00 |
|  | 100.00 | 100.00 | 100.00 | 100.00 |

The solids fraction of the copolymer of the invention or of the comparative compound is 15 wt. % relative to the pigment.

TABLE 1.6

|  | Example | | | |
|---|---|---|---|---|
|  | 19 [wt. %] | 20 [wt. %] | 21 [wt. %] | 22 [wt. %] |
| Silicone oil D5 | 75.00 | 61.25 | 29.17 | 61.25 |
| Copolymer of example 6 |  | 13.75 |  |  |
| ShinEtsu KP-575 (30% in silicone oil D5) |  |  | 45.83 |  |
| Dow Corning 5562 |  |  |  | 13.75 |
| D&C Black No. 2 | 25.00 | 25.00 | 25.00 | 25.00 |
|  | 100.00 | 100.00 | 100.00 | 100.00 |

The solids fraction of the copolymer of the invention or of the comparative compound is 55 wt. % relative to the pigment.

TABLE 2.1

Viscosities (EN ISO 2884-1: 2006) of the pigment preparations and of the comparative examples [in Pas] as a function of the shear rate [in 1/s] after production and storage.

| Shear rate | Pigment preparations of example | | | | | |
|---|---|---|---|---|---|---|
| [1/s] | 1 | 2 | 3 | 4 | 5 | 6 |
| Viscosity after 1 week's storage at 50° C. | 0.1 | 70 | 16 | 44 | 195 | 109 | 118 |

The pigment preparations according to table 2.1 that were produced using the copolymer of the invention (examples 2 and 5) consistently show the lowest viscosity.

TABLE 2.2

| Shear rate | Pigment preparations of example | | | | | | | |
|---|---|---|---|---|---|---|---|---|
| [1/s] | 7 | 8 | 9 | 10 | 11 | 12 | 13 | 14 |
| Viscosity 1 day after production | 1 | 26 | 0.60 | 1.9 | 22 | * | 78 | 91 | * |

* Production of a pigment preparation not possible

TABLE 2.3

| Shear rate | Pigment preparations of example | | | | | | | |
|---|---|---|---|---|---|---|---|---|
| [1/s] | 15 | 16 | 17 | 18 | 19 | 20 | 21 | 22 |
| Viscosity (1 day after production) | 1 | 62 | 0.04 | 0.08 | 18 | * | 0.13 | 0.31 | * |
| Viscosity (after 6 months' storage at room temperature) | 1 | — | — | — | — | — | 0.21 | 7.6 | — |

* Production of a pigment preparation not possible

The viscosity of the pigment preparations was measured at 23° C. using the Stresstech rheometer from Rheologica, with the CP25-1 cone measuring system (measurement slot 0.093 mm), at stated shear rates. Prior to application of the sample, the pigment preparations were stirred through with a spatula for homogenization. After the measuring system had been brought together, measurement took place after 10 seconds' preliminary shearing at 10 1/s and a subsequent rest time of 10 seconds.

The pigment preparations produced with the copolymer of the invention (examples 8, 12, 16, and 20) consistently show the lowest viscosity.

TABLE 3

Formulation of a silicone resin system for assessing the compatibilities of pigment preparations according to examples 1 to 6.

| Component | Product name | Description | wt. % | Supplier |
|---|---|---|---|---|
| A | Silopren E18 | OH terminated polydimethylsiloxane | 39.3 | Momentive |
|   | Silopren E0.5 | OH terminated polydimethylsiloxane | 31.3 | Momentive |
|   | Xylene |   | 2.2 |   |
|   | Dowanol PM |   | 5.6 |   |
| B | TEOS | Tetraethoxysilane | 19.6 |   |
| C | DBTL (10% in xylene) | Dibutyltin laurate | 2 |   |

The items of component A are first of all mixed homogeneously with stirring. Following individual addition of the further components, with stirring, the corresponding pigment preparation according to examples 1 to 6 is added as follows: Weight Ratio of Silicone Resin System to Pigment Preparation 9 parts silicone resin system: 1 part pigment preparation (pigment preparations 1 to 3)

1 part silicone resin system: 1 part pigment preparation (pigment preparations 4 to 6)

Following homogeneous dispersion of the pigment preparation and a preliminary reaction time of 20 minutes, the coating system is applied to contrast card, using a 100 μm wire doctor.

TABLE 4.1

Compatibility of the pigment preparations with the silicone resin system according to table 3:

| | Coating with pigment preparation of example | | |
|---|---|---|---|
| | 1 | 2 | 3 |
| Color locus [a*] *[1] (ISO 7724) | 35.6 | 38.3 | 35.9 |
| Color locus [a*] *[2] (ISO 7724) | 36.0 | 38.1 | 35.9 |
| Visual assessment of the coating *[2] (DIN 53230) | 5 | 2 | 4 |

*[1] After 1 day of storage of the pigment preparation
*[2] After 7 days of storage of the pigment preparation at 50° C.

TABLE 4.2

Compatibility of the pigment preparations with the silicone resin system according to table 3:

| | Coating with pigment preparation of example | | |
|---|---|---|---|
| | 4 | 5 | 6 |
| Color locus [L*] *[1] (ISO 7724) | 95.8 | 98.0 | 94.9 |
| Color locus [L*] *[2] (ISO 7724) | 94.9 | 98.0 | 97.5 |
| Visual assessment of the coating *[2] (DIN 53230) | 4 | 2 | 4 |
| Gloss *[2] Angle 60° (EN ISO 2813: 1999) | 40 | 57 | 28 |

*[1] After 1 day of storage of the pigment preparation
*[2] After 7 days of storage of the pigment preparation at 50° C.

To assess the compatibility, the pigment preparations, after appropriate storage, were used in the silicone resin system, proportionally as described above, and the coatings were assessed in particular for color locus and floating characteristics.

1=no floating, homogeneous distribution of pigment, no flocs
5=severe floating, severe inhomogeneity, numerous flocs.

In the case of the coating comprising the pigment preparation of example 2, produced with the inventive copolymer, there is homogeneous distribution and also virtually no pigment floating. In comparison, the color locus here is situated somewhat further in the advantageous reddish region.

The coating comprising the pigment preparation of example 5, produced with the inventive copolymer, exhibits a relatively high gloss value, and the color locus, in comparison, is in the advantageous lighter region.

Both inventive systems display very good color faithfulness and color stability, since the color locus remains the same after both 1 day and 7 days of storage. In particular, example 5, with the inventive copolymer according to example 6, exhibits improved color stability by comparison with comparative example 4, without dispersing additive, and comparative example 6, with Dow Corning 5562.

In the silicone resin system used, therefore, the pigment preparations produced with the inventive copolymer, by comparison with the comparative example, exhibit very good shade development and compatibility.

The invention claimed is:

1. A copolymer comprising at least one polysiloxane group attached to the basic copolymer scaffold, wherein said scaffold is an adduct of at least one amine and at least one epoxide and the polysiloxane group has been introduced into the copolymer via a monoisocyanate-functional polysiloxane (C), the copolymer optionally also being in salified or quaternized form.

2. The copolymer as claimed in claim 1, wherein the number-average molecular weight of the copolymer is 500 to 200 000 g/mol.

3. The copolymer as claimed in claim 1, wherein the copolymer is an amino-functionally terminated copolymer.

4. The copolymer as claimed in claim 1, wherein the at least one epoxide is an epoxide (A) of the following general formula (I):

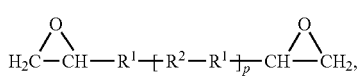

wherein all $R^1$s independently of one another are —$CH_2$—O—, —O—$CH_2$—, or —$CH_2$—, all $R^2$s independently of one another are alkylene radicals, cycloalkylene radicals, arylene radicals, or aralkylene radicals, and p is 1-8.

5. The copolymer as claimed in claim 4, wherein the epoxide (A) is a diepoxide of the general formula (I'):

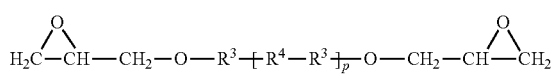

wherein all $R^3$s independently of one another are alkylene radicals, cycloalkylene radicals, arylene radicals, or aralkylene radicals, all $R^4$s independently of one another are O or alkylene radicals, and p is 0-8.

6. The copolymer as claimed in claim 1, wherein a monoisocyanate-functional polysiloxane (C) of the following formula is used:

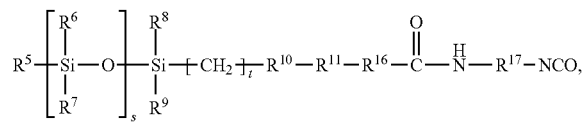

wherein $R^5$ is a halogenated alkyl radical having 1 to 30 carbon atoms, a saturated linear alkyl radical having 1 to 30 carbon atoms, a saturated branched or cyclic alkyl radical having 3 to 30 carbon atoms, or an aryl radical, an alkylaryl radical, or an arylalkyl radical having 6 to 30 carbon atoms, all $R^6$s and $R^7$s independently of one another are saturated linear alkyl radicals having 1 to 6 carbon atoms, saturated branched or cyclic alkyl radicals having 3 to 6 carbon atoms, unsaturated alkyl radicals having 2 to 6 carbon atoms, or aryl radicals, alkylaryl radicals, arylalkyl radicals having 6 to 12 carbon atoms, fluorinated alkyl radicals having 1 to 30 carbon atoms, or phenyl or substituted phenyl radicals, all $R^8$s and $R^9$s independently of one another are $R^5[SiR^6R^7O]_s$, where $R^5$, $R^6$, and $R^7$ are as defined above and are selected independently thereof, saturated linear alkyl radicals having 1 to 6 carbon atoms, saturated branched or cyclic alkyl radicals having 3 to 6 carbon atoms, alkene radicals having 2 to 6 carbon atoms, or aryl radicals, alkylaryl radicals, arylalkyl radicals having 6 to 12 carbon atoms, fluorinated alkyl radicals, or phenyl or substituted phenyl radicals, s is 1 to 400 and t is 2 to 30, $R^{10}$ is $(CH_2)_u$, O, S, or $C_6R^{14}_4$, where u is 0 or 1 and all $R^{14}$s independently of one another are hydrogen or an alkyl radical having 1 to 6 carbon atoms, $R^{11}$ is $(CH_2)_v$, or $(CH_2CHR^{15}O)_w$, where v is 0 to 30 and w is 0 to 50 and all $R^{15}$s independently of one another are hydrogen, a saturated linear alkyl radical having 1 to 6 carbon atoms, a saturated branched alkyl radical having 3 to 6 carbon atoms, or a cyclic alkyl radical having 4 to 6 carbon atoms, $R^{12}$ is $(CH_2)_x$ where x is 0 to 3, and $R^{13}$ is hydrogen, a saturated linear alkyl radical having 1 to 6 carbon atoms, a saturated branched alkyl radical having 3 to 6 carbon atoms, an aryl radical, an alkylaryl radical, or an arylalkyl radical having 6 to 9 carbon atoms, $R^{16}$ is O, S, or NH, and $R^{16}$ is omitted if w is at least 1, and $R^{17}$ is a saturated linear alkylene radical having 1 to 30 carbon atoms, a saturated branched or cyclic alkylene radical having 3 to 30 carbon atoms, or an arylene radical, an alkylarylene radical, or an arylalkylene radical having 6 to 30 carbon atoms.

7. The copolymer as claimed in claim 6, wherein the monoisocyanate-functional polysiloxane (C) possesses a linear or branched structure and has a number-average molecular weight in the range from 200 to 30 000 g/mol.

8. The copolymer as claimed in claim 1, wherein at least one polysiloxane-free amine (D) of the formula (II) is used for constructing the basic copolymer scaffold:

wherein $R^{18}$ is hydrogen, an alkyl radical, a cycloalkyl radical, an aryl radical, or an aralkyl radical and $R^{19}$ is an alkyl radical, a cycloalkyl radical, an aryl radical, an aralkyl radical, $R^{20}$—Z, or $CHR^{21}CH_2(OCH_2CH_2)_q$ $(OCHR^{22}CH_2)_r$—O—$R^{23}$, where $R^{20}$ is an alkylene radical, Z is a heterocyclic radical, $R^{21}$ is hydrogen, an alkyl radical having 1 to 4 carbon atoms, or an aryl radical, all $R^{22}$s independently of one another are alkyl radicals having 1 to 4 carbon atoms, or aryl radicals, $R^{23}$ is an alkyl radical having 1 to 12 carbon atoms, a cycloalkyl radical having 3 to 12 carbon atoms, or an aryl radical having 6 to 12 carbon atoms, and q and r independently of one another are integers from 0 to 100, with the proviso that at least one of the indices q and r is not 0.

9. The copolymer as claimed in claim 1, wherein at least one polysiloxane-free amine (D) of the formula (II):

wherein $R^{18}$ is hydrogen, an alkyl radical, a cycloalkyl radical, an aryl radical, or an aralkyl radical and $R^{19}$ is an alkyl radical, a cycloalkyl radical, an aryl radical, an aralkyl radical, $R^{20}$—Z, or $CHR^{21}CH_2(OCH_2CH_2)_q$ $(OCHR^{22}CH_2)_r$—O—$R^{23}$, where $R^{20}$ is an alkylene radical, Z is a heterocyclic radical, $R^{21}$ is hydrogen, an alkyl radical having 1 to 4 carbon atoms, or an aryl radical, all $R^{22}$s independently of one another are alkyl radicals having 1 to 4 carbon atoms, or aryl radicals, $R^{23}$ is an alkyl radical having 1 to 12 carbon atoms, a cycloalkyl radical having 3 to 12 carbon atoms, or an aryl radical having 6 to 12 carbon atoms, and q and r independently of one another are integers from 0 to 100, with the proviso that at least one of the indices q and r is not 0;

is used for constructing the basic copolymer scaffold, the polysiloxane-free amine (D) bearing at least one further functional group, the functional group preferably being a hydroxyl group, a tertiary amino group, or a double bond.

10. A process for preparing a copolymer as claimed in claim 1, wherein the basic copolymer scaffold is synthesized by reacting at least one epoxide with at least one amine and in that at least one polysiloxane group is attached to the basic scaffold, the polysiloxane group being introduced
by the reaction of an epoxy/amine copolymer with a monoisocyanate-functional polysiloxane (C).

11. Coating materials, plastics or cosmetics comprising a copolymer of claim 1, wherein the copolymer functions as a wetting and dispersing agent, leveling agent, defoamer, stabilizer or dirt and oil repellent agent in said coating materials, plastics or cosmetics
wherein the copolymer fraction is 0.01 to 5 wt. %, based in each case on the overall composition of the coating material, plastic or cosmetic.

12. The coating materials, plastics or cosmetics as claimed in claim 11, wherein the copolymer fraction is 0.03 to 1 wt. %, based in each case on the overall composition of the coating material, plastic or cosmetic.

13. A process for preparing a homogeneous dispersion comprising at least one copolymer as claimed in claim 1
wherein the process comprises mixing of at least one pigment and/or filler in a vehicle selected from the group consisting of at least one silicone oil with at least one copolymer as claimed in claim 1.

14. Coating materials or plastics comprising at least one copolymer as claimed in claim 1
wherein the copolymer fraction is 0.01 to 5 wt. % based in each case on the overall composition of the coating material or of the plastic, in coating materials or plastics.

15. The coating materials or plastics as claimed in claim 14, wherein the copolymer fraction is 0.03 to 1 wt. % based in each case on the overall composition of the coating material or of the plastic, in coating materials or plastics.

16. Coating materials, plastics or cosmetics comprising a copolymer made by the process of claim 10.

17. The coating materials, plastics or cosmetics of claim 16, wherein the copolymer functions as a wetting and dispersing agent, leveling agent, defoamer, stabilizer or dirt and oil repellent agent in said coating materials, plastics or cosmetics.

18. The coating materials, plastics or cosmetics as claimed in claim 16, wherein the copolymer fraction is 0.01 to 5 wt. %, based in each case on the overall composition of the coating material or of the plastic, in coating materials or plastics.

19. A process for preparing a homogeneous dispersion comprising at least one copolymer made by the process as claimed in claim 10, wherein the process comprises mixing of at least one pigment and/or filler in a vehicle selected from the group consisting of at least one silicone oil with at least one copolymer made by the process as claimed in claim 10.

20. A paint, a paste or a molding compound comprising:
at least one of one or more pigments, organic solvents, water, and binders; and
0.01 to 5 wt. % of a copolymer of claim 1.

21. Homogeneous dispersions that are at least one of a pigment preparation comprising one or more pigments and a filler preparation comprising one or more fillers, the homogeneous dispersions comprising:
a copolymer comprising at least one polysiloxane group attached to the basic copolymer scaffold, wherein said scaffold is an adduct of at least one amine and at least one epoxide and the polysiloxane group has been introduced into the copolymer via a monoamino-functional polysiloxane (B), the copolymer optionally also being in salified or quaternized form, wherein the monoamino-functional polysiloxane (B) is of the formula:

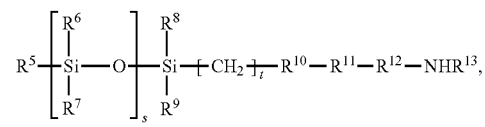

wherein $R^5$ is a halogenated alkyl radical having 1 to 30 carbon atoms, a saturated linear alkyl radical having 1 to 30 carbon atoms, a saturated branched or cyclic alkyl radical having 3 to 30 carbon atoms, or an aryl radical, an alkylaryl radical, or an arylalkyl radical having 6 to 30 carbon atoms, all $R^6$s and $R^7$s independently of one another are saturated linear alkyl radicals having 1 to 6 carbon atoms, saturated branched or cyclic alkyl radicals having 3 to 6 carbon atoms, unsaturated alkyl radicals having 2 to 6 carbon atoms, or aryl radicals, alkylaryl radicals, arylalkyl radicals having 6 to 12 carbon atoms, fluorinated alkyl radicals having 1 to 30 carbon atoms, or phenyl or substituted phenyl radicals, all $R^8$s and $R^9$s independently of one another are $R^5[SiR^6R^7O]_s$, where $R^5$, $R^6$, and $R^7$ are as defined above and are selected independently thereof, saturated linear alkyl radicals having 1 to 6 carbon atoms, saturated branched or cyclic alkyl radicals having 3 to 6 carbon atoms, alkene radicals having 2 to 6 carbon atoms, aryl radicals, alkylaryl radicals, or arylalkyl radicals having 6 to 12 carbon atoms, fluorinated alkyl radicals, or phenyl or substituted phenyl radicals, s is 1 to 400 and t is 2 to 30, $R^{10}$ is $(CH_2)_u$, O, S, or $C_6R^{14}_4$, where u is 0 or 1 and all $R^{10}$s independently of one another are hydrogen or an alkyl radical having 1 to 6 carbon atoms, $R^{11}$ is $(CH_2)_v$ or $(CH_2CHR^{15}O)_w$, where v is 0 to 30 and w is 0 to 50 and all $R^{15}$s independently of one another are hydrogen, a saturated linear alkyl radical having 1 to 6 carbon atoms, a saturated branched alkyl radical having 3 to 6 carbon atoms, or a cyclic alkyl radical having 4 to 6 carbon atoms, $R^{12}$ is $(CH_2)_x$ where x is 0 to 3, and $R^{13}$ is hydrogen, a saturated linear alkyl radical having 1 to 6 carbon atoms, a saturated branched alkyl radical having 3 to 6 carbon atoms, an aryl radical, an alkylaryl radical, or an arylalkyl radical having 6 to 9 carbon atoms, wherein the copolymer functions as a wetting and dispersing agent, leveling agent, defoamer, stabilizer or dirt and oil repellent agent in said homogeneous dispersions; and wherein the copolymer fraction is 0.01 to 90 wt. % in homogeneous dispersions based in each case on the overall composition of the homogeneous dispersion.

22. The homogeneous dispersions as claimed in claim 21, wherein the copolymer fraction is 2 to 40 wt. % based on the overall composition of the homogeneous dispersion.

23. The homogenous dispersions as claimed in claim 21, wherein $[CH_2]_t R^{10} R^{11} R^{12} NHR^{13}$ in the monoamino-functional polysiloxane (B) is a 2-aminoethyl radical, a 3-aminopropyl radical, a 3-aminopropyl ethyl ether radical, or a 6-aminohexyl radical.

24. A process for preparing a homogeneous dispersion comprising a copolymer comprising at least one polysiloxane group attached to the basic copolymer scaffold, wherein said scaffold is an adduct of at least one amine and at least one epoxide and the polysiloxane group has been introduced into the copolymer via a monoamino-functional polysiloxane (B), the copolymer optionally also being in salified or quaternized form, wherein the monoamino-functional polysiloxane (B) is of the formula:

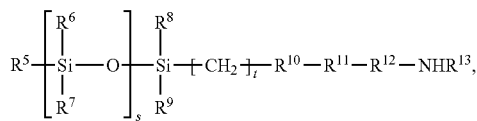

wherein $R^5$ is a halogenated alkyl radical having 1 to 30 carbon atoms, a saturated linear alkyl radical having 1 to 30 carbon atoms, a saturated branched or cyclic alkyl radical having 3 to 30 carbon atoms, or an aryl radical, an alkylaryl radical, or an arylalkyl radical having 6 to 30 carbon atoms, all $R^6$s and $R^7$s independently of one another are saturated linear alkyl radicals having 1 to 6 carbon atoms, saturated branched or cyclic alkyl radicals having 3 to 6 carbon atoms, unsaturated alkyl radicals having 2 to 6 carbon atoms, or aryl radicals, alkylaryl radicals, arylalkyl radicals having 6 to 12 carbon atoms, fluorinated alkyl radicals having 1 to 30 carbon atoms, or phenyl or substituted phenyl radicals, all $R^8$s and $R^9$s independently of one another are $R^5[SiR^6R^7O]_s$, where $R^5$, $R^6$, and $R^7$ are as defined above and are selected independently thereof, saturated linear alkyl radicals having 1 to 6 carbon atoms, saturated branched or cyclic alkyl radicals having 3 to 6 carbon atoms, alkene radicals having 2 to 6 carbon atoms, aryl radicals, alkylaryl radicals, or arylalkyl radicals having 6 to 12 carbon atoms, fluorinated alkyl radicals, or phenyl or substituted phenyl radicals, s is 1 to 400 and t is 2 to 30, $R^{10}$ is $(CH_2)_u$, O, S, or $C_6R^{14}_4$, where u is 0 or 1 and all $R^{10}$s independently of one another are hydrogen or an alkyl radical having 1 to 6 carbon atoms, $R^{11}$ is $(CH_2)_v$ or $(CH_2CHR^{15}O)_w$, where v is 0 to 30 and w is 0 to 50 and all $R^{15}$s independently of one another are hydrogen, a saturated linear alkyl radical having 1 to 6 carbon atoms, a saturated branched alkyl radical having 3 to 6 carbon atoms, or a cyclic alkyl radical having 4 to 6 carbon atoms, $R^{12}$ is $(CH_2)_x$ where x is 0 to 3, and $R^{13}$ is hydrogen, a saturated linear alkyl radical having 1 to 6 carbon atoms, a saturated branched alkyl radical having 3 to 6 carbon atoms, an aryl radical, an alkylaryl radical, or an arylalkyl radical having 6 to 9 carbon atoms, wherein the process comprises mixing of at least one pigment and/or filler in a vehicle selected from the group consisting of at least one silicone oil with the copolymer comprising at least one polysiloxane group attached to the basic copolymer scaffold, wherein said scaffold is an adduct of at least one amine and at least one epoxide and the polysiloxane group has been introduced into the copolymer via a monoamino-functional polysiloxane (B), the copolymer optionally also being in salified or quaternized form.

25. The homogenous dispersions as claimed in claim 21, wherein the organopolysiloxane radical $R^5[SiR^6R^7O]_s SiR^8R^9$ of component (B) possesses a linear or branched structure and has a number-average molecular weight in the range from 200 to 30 000 g/mol.

26. Homogeneous dispersions that are at least one of a pigment preparation comprising one or more pigments and a filler preparation comprising one or more fillers, the homogeneous dispersions comprising:

a copolymer comprising at least one polysiloxane group attached to the basic copolymer scaffold, wherein said scaffold is an adduct of at least one amine and at least one epoxide and the polysiloxane group has been introduced into the copolymer via a monoamino-functional polysiloxane (B), the copolymer optionally also being in salified or quaternized form, wherein the monoamino-functional polysiloxane (B) is of the formula:

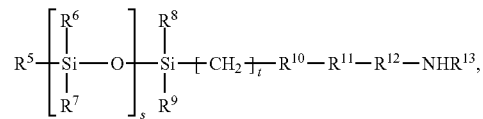

wherein $R^5$ is a halogenated alkyl radical having 1 to 30 carbon atoms, a saturated linear alkyl radical having 1 to 30 carbon atoms, a saturated branched or cyclic alkyl radical having 3 to 30 carbon atoms, or an aryl radical, an alkylaryl radical, or an arylalkyl radical having 6 to 30 carbon atoms, all $R^6$s and $R^7$s independently of one another are saturated linear alkyl radicals having 1 to 6 carbon atoms, saturated branched or cyclic alkyl radicals having 3 to 6 carbon atoms, unsaturated alkyl radicals having 2 to 6 carbon atoms, or aryl radicals, alkylaryl radicals, arylalkyl radicals having 6 to 12 carbon atoms, fluorinated alkyl radicals having 1 to 30 carbon atoms, or phenyl or substituted phenyl radicals, all $R^8$s and $R^9$s independently of one another are $R^5[SiR^6R^7O]_s$, where $R^5$, $R^6$, and $R^7$ are as defined above and are selected independently thereof, saturated linear alkyl radicals having 1 to 6 carbon atoms, saturated branched or cyclic alkyl radicals having 3 to 6 carbon atoms, alkene radicals having 2 to 6 carbon atoms, aryl radicals, alkylaryl radicals, or arylalkyl radicals having 6 to 12 carbon atoms, fluorinated alkyl radicals, or phenyl or substituted phenyl radicals, s is 1 to 400 and t is 2 to 30, $R^{10}$ is $(CH_2)_u$, O, S, or $C_6R^{14}_4$, where u is 0 or 1 and all $R^{10}$s independently of one another are hydrogen or an alkyl radical having 1 to 6 carbon atoms, $R^{11}$ is $(CH_2)_v$ or $(CH_2CHR^{15}O)_w$, where v is 0 to 30 and w is 0 to 50 and all $R^{15}$s independently of one another are hydrogen, a saturated linear alkyl radical having 1 to 6 carbon atoms, a saturated branched alkyl radical having 3 to 6 carbon atoms, or a cyclic alkyl radical having 4 to 6 carbon atoms, $R^{12}$ is $(CH_2)_x$ where x is 0 to 3, and $R^{13}$ is hydrogen, a saturated linear alkyl radical having 1 to 6 carbon atoms, a saturated branched alkyl radical having 3 to 6 carbon atoms, an aryl radical, an alkylaryl radical, or an arylalkyl radical having 6 to 9 carbon atoms;

wherein the copolymer fraction is 0.01 to 90 wt. % in homogeneous dispersions based in each case on the overall composition of the homogeneous dispersion.

27. The homogeneous dispersions as claimed in claim 26, wherein the copolymer fraction is 2 to 40 wt. % based in each case on the overall composition of the homogeneous dispersion.

28. A paint, a paste or a molding compound comprising:
a copolymer composition comprising one or more pigments, organic solvents and/or water, binders and 0.01 to 5 wt. % of a copolymer comprising at least one polysiloxane group attached to the basic copolymer scaffold, wherein said scaffold is an adduct of at least one amine and at least one epoxide and the polysiloxane group has been introduced into the copolymer via a monoamino-functional polysiloxane (B), the copolymer optionally also being in salified or quaternized form, wherein the monoamino-functional polysiloxane (B) is of the formula:

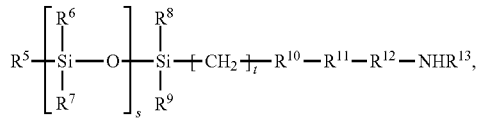

wherein $R^5$ is a halogenated alkyl radical having 1 to 30 carbon atoms, a saturated linear alkyl radical having 1 to 30 carbon atoms, a saturated branched or cyclic alkyl radical having 3 to 30 carbon atoms, or an aryl radical, an alkylaryl radical, or an arylalkyl radical having 6 to 30 carbon atoms, all $R^6$s and $R^7$s independently of one another are saturated linear alkyl radicals having 1 to 6 carbon atoms, saturated branched or cyclic alkyl radicals having 3 to 6 carbon atoms, unsaturated alkyl radicals having 2 to 6 carbon atoms, or aryl radicals, alkylaryl radicals, arylalkyl radicals having 6 to 12 carbon atoms, fluorinated alkyl radicals having 1 to 30 carbon atoms, or phenyl or substituted phenyl radicals, all $R^8$s and $R^9$s independently of one another are $R^5[SiR^6R^7O]_s$, where $R^5$, $R^6$, and $R^7$ are as defined above and are selected independently thereof, saturated linear alkyl radicals having 1 to 6 carbon atoms, saturated branched or cyclic alkyl radicals having 3 to 6 carbon atoms, alkene radicals having 2 to 6 carbon atoms, aryl radicals, alkylaryl radicals, or arylalkyl radicals having 6 to 12 carbon atoms, fluorinated alkyl radicals, or phenyl or substituted phenyl radicals, s is 1 to 400 and t is 2 to 30, $R^{10}$ is $(CH_2)_u$, O, S, or $C_6R^{14}_4$, where u is 0 or 1 and all $R^{10}$s independently of one another are hydrogen or an alkyl radical having 1 to 6 carbon atoms, $R^{11}$ is $(CH_2)_v$ or $(CH_2CHR^{15}O)_w$, where v is 0 to 30 and w is 0 to 50 and all $R^{15}$s independently of one another are hydrogen, a saturated linear alkyl radical having 1 to 6 carbon atoms, a saturated branched alkyl radical having 3 to 6 carbon atoms, or a cyclic alkyl radical having 4 to 6 carbon atoms, $R^{12}$ is $(CH_2)_x$ where x is 0 to 3, and $R^{13}$ is hydrogen, a saturated linear alkyl radical having 1 to 6 carbon atoms, a saturated branched alkyl radical having 3 to 6 carbon atoms, an aryl radical, an alkylaryl radical, or an arylalkyl radical having 6 to 9 carbon atoms.

* * * * *